(12) United States Patent
Cape et al.

(10) Patent No.: US 12,515,474 B2
(45) Date of Patent: *Jan. 6, 2026

(54) MICRO-OPTIC SECURITY DEVICE WITH PHASE ALIGNED IMAGE LAYERS

(71) Applicant: Crane & Co., Inc., Dalton, MA (US)

(72) Inventors: Samuel M. Cape, Woodstock, GA (US); Jonathan D. Gosnell, Cumming, GA (US); Benjamin E. Bleiman, Cumming, GA (US); Paul F. Cote, Barnstead, NH (US)

(73) Assignee: Crane & Co., Inc., Dalton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,464

(22) Filed: Apr. 10, 2024

(65) Prior Publication Data

US 2024/0253385 A1  Aug. 1, 2024

Related U.S. Application Data

(63) Continuation of application No. 17/757,204, filed as application No. PCT/US2020/065701 on Dec. 17, 2020, now Pat. No. 11,975,558.

(Continued)

(51) Int. Cl.
*B42D 25/40* (2014.01)
*B42D 25/324* (2014.01)
(Continued)

(52) U.S. Cl.
CPC ......... *B42D 25/351* (2014.10); *B42D 25/324* (2014.10); *B42D 25/40* (2014.10); *B42D 25/41* (2014.10); *B42D 25/45* (2014.10)

(58) Field of Classification Search
None
See application file for complete search history.

(56) References Cited

U.S. PATENT DOCUMENTS

| 10,265,995 B2 | 4/2019 | Jung et al. |
| 2007/0058260 A1 | 3/2007 | Steenblik et al. |

(Continued)

FOREIGN PATENT DOCUMENTS

| CA | 3062579 A1 | 12/2018 |
| CN | 109789721 A | 5/2019 |

(Continued)

OTHER PUBLICATIONS

Notice of Reasons for Refusal dated Oct. 8, 2024, in connection with Japanese Application No. 2022-538265, 11 pages.

(Continued)

*Primary Examiner* — Kyle R Grabowski

(57) ABSTRACT

A micro-optic security device (105) includes a planar array of microlenses (305), which are configured to focus light along a plurality of focal paths (610) associated with a viewing angle. The micro-optic security device further includes an icon layer stack (905) disposed along the plurality of focal paths. The icon layer stack includes a first icon layer (620) with volumes of cured material of a first color (613b) and volumes of substantially transparent material at locations outside of focal paths of the first range of viewing angles. The icon layer stack also includes a second icon layer (640) with volumes of substantially transparent cured material at locations along focal paths of the first range of viewing angles, and volumes of cured material of a second color (637a) at locations along focal paths of a second range of viewing angles.

20 Claims, 20 Drawing Sheets

Related U.S. Application Data

(60) Provisional application No. 62/950,054, filed on Dec. 18, 2019.

(51) Int. Cl.
*B42D 25/351* (2014.01)
*B42D 25/41* (2014.01)
*B42D 25/45* (2014.01)

(56) References Cited

U.S. PATENT DOCUMENTS

| | | |
|---|---|---|
| 2007/0273143 A1 | 11/2007 | Crane et al. |
| 2011/0122499 A1 | 5/2011 | Commander et al. |
| 2011/0209328 A1 | 9/2011 | Steenblik et al. |
| 2012/0194916 A1 | 8/2012 | Cape et al. |
| 2017/0173990 A1 | 6/2017 | Cape et al. |
| 2017/0210161 A1 | 7/2017 | Cape et al. |
| 2018/0134063 A1 | 5/2018 | Power |
| 2018/0272788 A1 | 9/2018 | Bleiman et al. |
| 2019/0152251 A1 | 5/2019 | Schilling et al. |

FOREIGN PATENT DOCUMENTS

| | | |
|---|---|---|
| CN | 109903672 A | 6/2019 |
| CN | 110582412 A | 12/2019 |
| DE | 102011115125 A1 | 4/2013 |
| JP | 2008545550 A | 12/2008 |
| JP | 2009543138 A | 12/2009 |
| JP | 2013509312 A | 3/2013 |
| JP | 2017522602 A | 8/2017 |
| WO | 2006125224 A2 | 11/2006 |
| WO | 2008008635 A2 | 1/2008 |
| WO | 2011051668 A1 | 5/2011 |
| WO | 2016183635 A1 | 11/2016 |
| WO | 2018060726 A1 | 4/2018 |
| WO | 2018147966 A1 | 8/2018 |
| WO | 2020237261 A1 | 11/2020 |
| WO | 2020252507 A1 | 12/2020 |

OTHER PUBLICATIONS

Search Report dated Mar. 18, 2024, in connection with Brazilian Application No. BR112022012131-8, 8 pages.
Supplementary European Search Report dated May 16, 2024, in connection with European Application No. 20902310.0, 16 pages.
Office Action dated Dec. 24, 2024, in connection with Chinese Application No. 202080087787.3, 20 pages.
Decision of Refusal dated Feb. 25, 2025, in connection with Japanese Application No. 2022-538265, 8 pages.
Extended European Search Report dated May 23, 2025, in connection with European Application No. 24219479.3, 17 pages.
Notice on the Result of Substantive Examination dated Jun. 30, 2025, in connection with Indonesian Application No. P00202207539, 6 pages.
Examination Report No. 1 dated Oct. 9, 2025, in connection with Australian Application No. 2020408042, 5 pages.
First Examination Report dated Oct. 24, 2025, in connection with Indian Application No. 202227038195, 9 pages.
Notice on the Result of Substantive Examination dated Nov. 11, 2025, in connection with Indonesian Application No. P00202207539, 6 pages.
Notice of Preliminary Rejection dated Dec. 8, 2025, in connection with Korean Application No. 10-2022-7022799, 20 pages.
International Search Report and Written Opinion of the International Searching Authority dated Apr. 5, 2021, in connection with International Application No. PCT/US2020/065701, 11 pages.
Communication pursuant to Rule 164(1) EPC dated Jan. 4, 2024, in connection with European Application No. 20902310.0, 14 pages.
Examination Report dated Jan. 23, 2024, in connection with Canadian Application No. 3,164,980, 5 pages.
Decision to Grant dated Mar. 1, 2024, in connection with Russian Application No. 2022118827, 26 pages.

MICRO-OPTIC SECURITY DEVICE WITH PHASE ALIGNED IMAGE LAYERS

CROSS-REFERENCE TO RELATED APPLICATIONS

This application is a continuation of application Ser. No. 17/757,204, filed Jun. 10, 2022, which is a 371 National Stage of International Application No. PCT/US2020/065701, filed Dec. 17, 2020, which claims priority to U.S. Provisional Patent Application No. 62/950,054, filed Dec. 18, 2019, the disclosures of which are incorporated herein by reference.

TECHNICAL FIELD

The present disclosure relates to systems for enhancing the counterfeit resistance of security documents. More specifically, this disclosure relates to a micro-optic security device with phase aligned image layers.

BACKGROUND

Depending on their construction and integration into the end product, micro-optic security devices with a dynamic, difficult to reproduce appearance can significantly enhance the counterfeit resistance of security documents, such as currency notes, passports and other documents requiring trustworthy visual indicia of authenticity. The overall effectiveness of a particular micro-optic security device depends on a plurality of variables, including, without limitation, the distinctiveness of visual effects produced by the device, the difficulty of reproduction, and the device's capacity for large-scale production. For example, a micro-optic security device which produces an indistinct or visually uninteresting visual effect, is less likely to be noticed by most end-users, and by implication, its absence is similarly likely to go unnoticed by end-users. In such cases, the likelihood of counterfeit documents, which lack the correct micro-optic security device, being circulated undetected is higher than in cases where the micro-optic security device provides a visual effect which, due to some combination of clarity or novelty, stands out to end users. Similarly, the effectiveness of a micro-optic security device is enhanced when it can be manufactured at scale, thereby lowering the price point and catalyzing widespread adoption. Pushing the envelope with respect to achieving increasingly distinctive visual effects which are simultaneously, beyond the reach of counterfeiters, but at the same time, capable of being manufactured at scale by legitimate actors, remains a persistent source of technical challenges and opportunities for improvement within the field of micro-optic security device design.

SUMMARY

The present disclosure illustrates embodiments of a micro-optic security device with phase aligned image layers.

In a first embodiment, a micro-optic security device includes a planar array of microlenses, which are configured to focus light along a plurality of focal paths, the plurality of focal paths associated with a viewing angle of the micro-optic security device. The micro-optic security device further includes an icon layer stack disposed along the plurality of focal paths. The icon layer stack includes a first icon layer, that includes volumes of cured material of a first color at locations along focal paths of a first range of viewing angles, and volumes of substantially transparent material at locations outside of focal paths of the first range of viewing angles. The icon layer stack also includes a second icon layer disposed below the first icon layer relative to the planar array of microlenses. The second icon layer also includes volumes of substantially transparent cured material at locations along focal paths of the first range of viewing angles, and volumes of cured material of a second color at locations along focal paths of a second range of viewing angles. At least one of the first icon layer or the second icon layer includes a plurality of substantially transparent retaining structures.

In a second embodiment, a micro-optic security device, includes a planar array of focusing elements, configured to focus light along a plurality of focal paths, the plurality of focal paths associated with a viewing angle of the micro-optic security device. The micro-optic security device further includes an icon layer stack disposed along the plurality of focal paths. The icon layer stack includes a first icon layer including volumes of directionally cured material of a first color, wherein the volumes of directionally cured material of the first color are associated with a first range of viewing angles of the micro-optic security device. The icon layer stack also includes a second icon layer with volumes of directional cured material of a second color, at locations along focal paths of a second range of viewing angles. At least one of the first icon layer or the second icon layer includes a plurality of substantially transparent retaining structures. Further, the second range of viewing angles is not coextensive with the first range of viewing angles.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description, taken in conjunction with the accompanying drawings, in which like reference numerals represent like parts.

DETAILED DESCRIPTION

FIGS. 1A through 9, discussed below, and the various embodiments used to describe the principles of the present disclosure are by way of illustration only and should not be construed in any way to limit the scope of the disclosure. Those skilled in the art will understand that the principles of the present disclosure may be implemented in a wide variety of suitably constructed micro-optic security devices.

Although the present disclosure has been described with various embodiments, various changes and modifications may be suggested to one skilled in the art. It is intended that the present disclosure encompass such changes and modifications as falling within the scope of the claims.

Figure 1A:
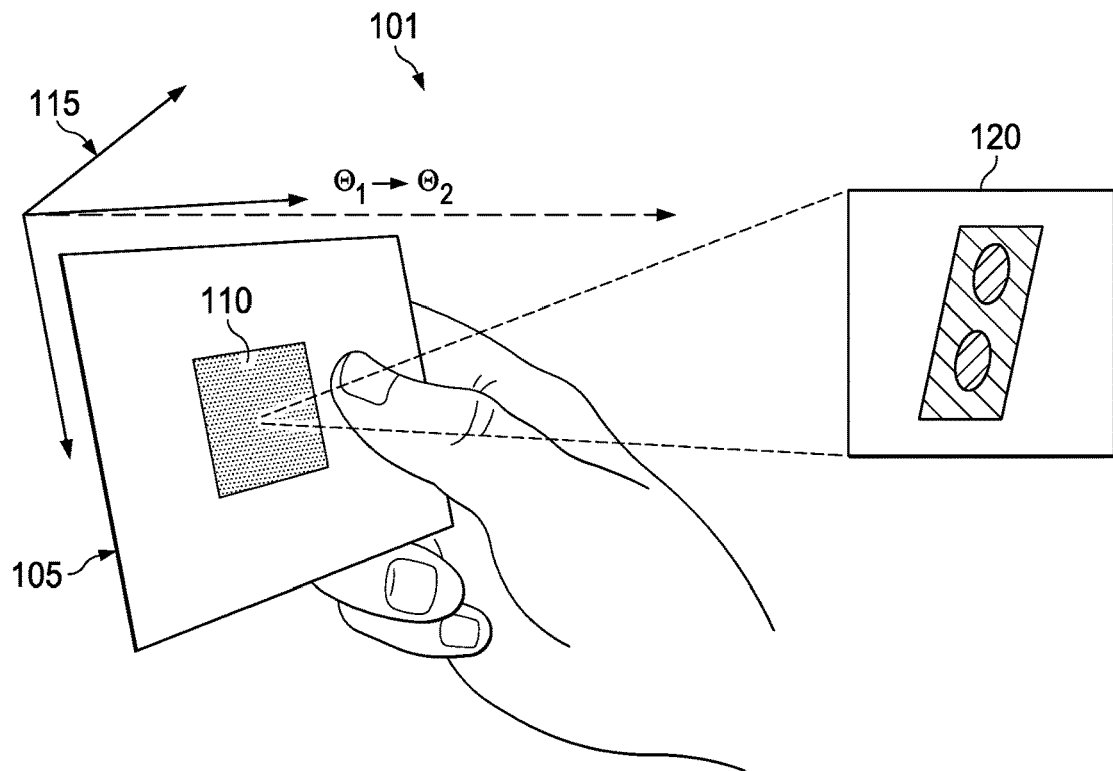
FIGS. 1A and 1B illustrate an example of a micro-optic security device according to various embodiments of this disclosure, as well as aspects of the micro-optic security device's operation.
Figure 1B:
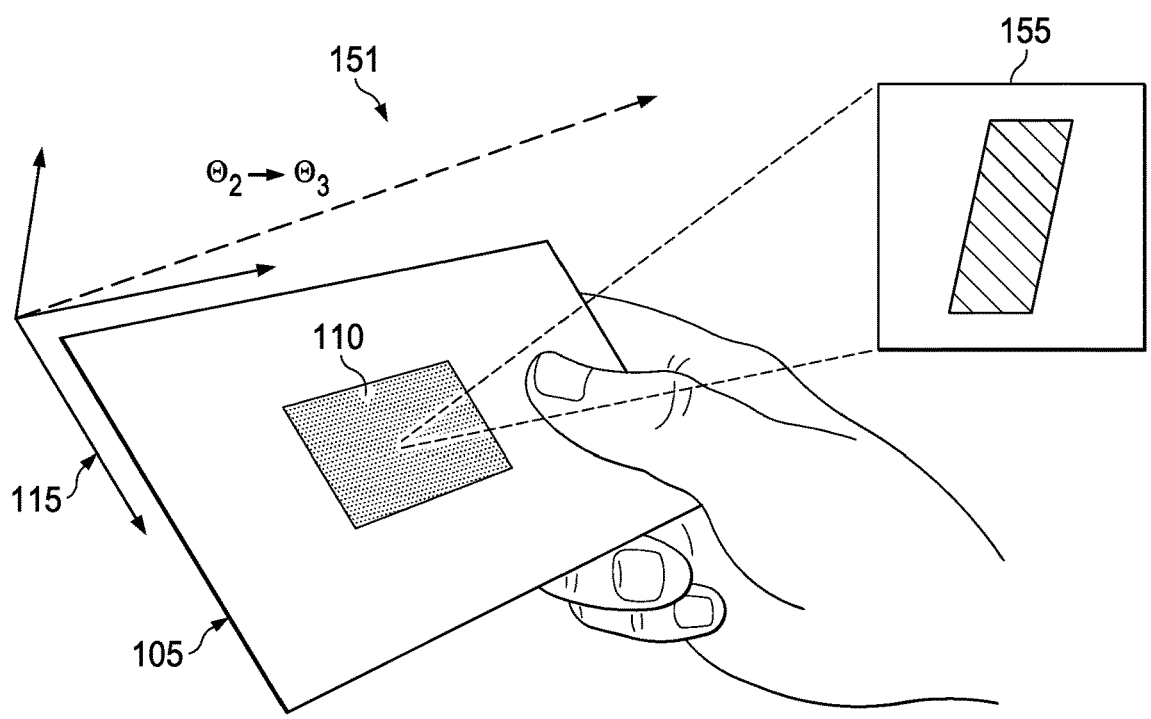

FIGS. 1A and 1B illustrate an example of a micro-optic security device according to certain embodiments of this disclosure and aspects of the micro-optic security device's operation.

Referring to the non-limiting example of FIGS. 1A-B, a first view 101 (shown in FIG. 1A) and a second view 151 (shown in FIG. 1B) of a security document 105 comprising a micro-optic security device 110 are provided in the figures. According to various embodiments, security document 105 is a passport, currency note, identification card, or other document which benefits from trustworthy visual indicia of authenticity. In the non-limiting example of FIGS. 1A-B, micro-optic security device 110 comprises a layer of focusing elements (for example, microlenses), and an image stack comprising a region in which two or more layers of image icons are phase-aligned. As used in this disclosure, the term "phase-aligned," as used with reference to icon structures within the layers of a multi-layer icon stack, encompasses the property wherein colored icons of a first icon layer occupy locations of the first icon layer associated with focal paths of a first range of viewing angles, colored icons of a second icon layer occupy locations of the second icon layer associated with focal paths of a second range of viewing angles, colored icons of the first icon layer occupy locations within the first icon layer associated with focal paths outside of the second range of viewing angles, and colored icons of the second icon layer occupy locations of the second layer associated with focal paths outside of the first range of viewing angles. In practical terms, where colored image icons are phase-aligned according to certain embodiments of this disclosure, cross-talk, or the condition where, for a given range of viewing angles, colored image icons from two or more layers of an icon stack are simultaneously projected by the focusing elements, can be substantially controlled, and incorporated or eliminated as a design feature of a synthetic image projected by the micro-optic security device. According to certain embodiments of this disclosure, controlling the incidence of cross-talk between image icon layers facilitates the creation of micro-optic security devices which exhibit improvement along at least three dimensions by which the performance of micro-optic security devices is measured. Specifically, with phase alignment between image icons as a controllable design parameter, transitions between multi-color synthetic images projected by the micro-optic security device at a first range of viewing angles to synthetic images projected by the micro-optic security device over a second range of viewing angles can become crisper, and embodiments according to this disclosure can, for example, both produce multi-color "flicker" effects, wherein a synthetic image comprises colored components which rapidly appear and disappear, as well as effects wherein colored regions of the synthetic image progressively move or change color. The incorporation of multi-color "flicker" effects, in addition to progressively evolving colored effects, can provide synthetic images that are eye-catching and engage viewers. Additionally, achieving phase alignment between layers of icon layers presents additional manufacturing challenges, and by implication, makes such devices even harder to counterfeit by malicious actors. Third, certain embodiments according to this disclosure can be manufactured with structured icon tooling (for example, molds for embossing retaining structures into a layer of UV-curable polymer), and as such, can be presently manufactured at scale.

As shown in first view 101, when security document 105 is oriented such that the surface of the document occupies values within a first range of viewing angles $\Theta_1 \rightarrow \Theta_2$ in coordinate system 115, the icon structures and focusing elements of micro-optic security device 110 project a two-colored first synthetic image 120, comprising a pair of ovals of a first color in a polygonal field of a contrasting second color. As shown in the example of FIGS. 1A-B, the viewer tilts security document 105 through the first range of viewing angles $\Theta_1 \rightarrow \Theta_2$ until it enters a second range of viewing angles, $\Theta_2 \rightarrow \Theta_3$ shown in second view 151. In this example, the pair of ovals "shut off" as document moves from the first range of viewing angles to the second range of viewing angles, and, as shown in second view 151, the micro-optic system projects a second synthetic image, which, in this illustrative example, is the polygonal field of the contrasting second color. Accordingly, micro-optic systems according to various embodiments of this disclosure provide crisp transitions from one synthetic image to another synthetic image as the device moves between ranges of viewing angles.

While FIGS. 1A-B provide an example of a transition from a two color synthetic image to a single color synthetic image, embodiments according to this disclosure are not limited thereto, and further embodiments involving more colors and ranges of viewing angles are possible and within the contemplated scope of this disclosure. Further, embodiments wherein the colored icons of multiple layers of an icon layer stack are of the same color (producing interesting motion effects as the focusing elements transition from focusing on icons at a first depth to focusing on icons at a second depth) are possible, and within the contemplated scope of this disclosure.

Figure 2A:
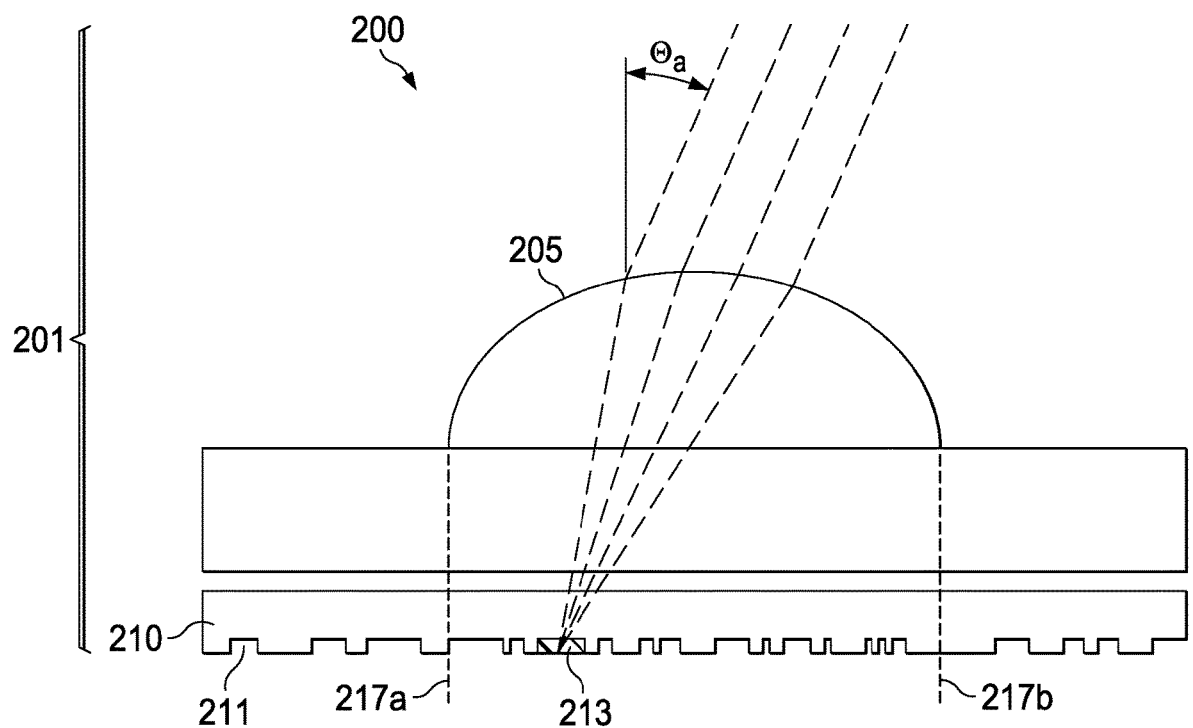
FIGS. 2A and 2B illustrate, by way of background, aspects of the technical challenges associated with achieving phase alignment in a micro-optic security device.
Figure 2B:
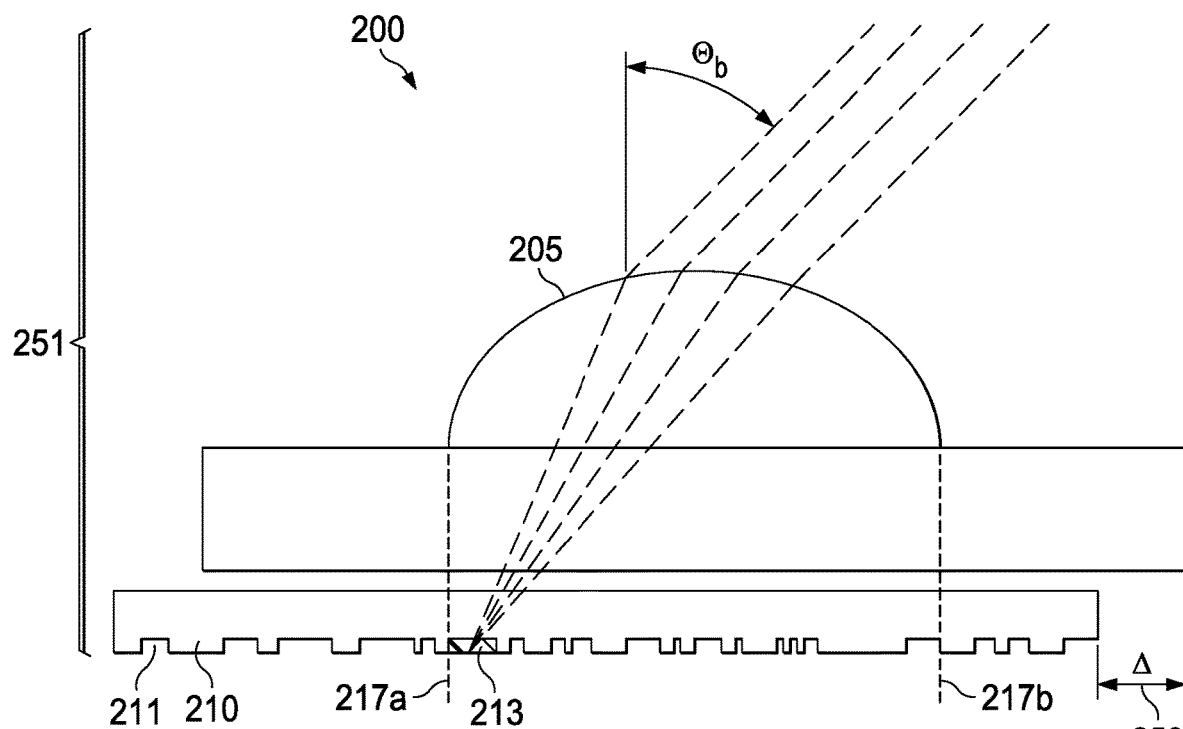

FIGS. 2A-2B illustrate, by way of background, aspects of the technical challenges associated with achieving phase alignment within a micro-optic security device.

In the illustrative example of FIGS. 2A-B, a first view 201 (shown in FIG. 2A) and a second view 251 (shown in FIG. 2B) of a micro-optic cell 200 are shown. A micro-optic security device comprises a plurality (typically millions or more) of micro-optic cells. At a basic level, a micro-optic cell comprises a focusing element and one or more icon structures within focal regions (also referred to as a "footprint") of the focusing element. In the explanatory example of FIGS. 2A-B, micro-optic cell 200 comprises focusing element 205, which in this example, is a plano-convex microlens. Other focusing elements are possible, including without limitation, reflective focusing elements (i.e., very small curved mirrors) and gradient-index ("GRIN") lenses.

In this example, micro-optic cell 200 further comprises an image icon layer 210, which contains retaining structures (for example, retaining structure 211), in which icons 213 of colored material can be formed. The angle $\Theta_a$, at which icon 213 are projected to a viewer by focusing element 205, depends on its location within the footprint (shown by left and right boundaries 217a and 217b) of focusing element 205. As shown with reference to second view 251, small shifts 253 in the position of an icon with respect to the footprint of focusing element 205 translate into a change in the angle $\Theta_b$, at which icon 213 is projected to a viewer. When manufactured at scale, some variation in the registration of the retaining structures of image icon layer 210 relative to the footprint of focusing element is generally inevitable. In certain real-world applications, the variations in registration between focusing elements can be on the order of the pitch of the lenses of the lens array.

In the context of a micro-optic security device with a single image icon layer, variations in the registration of the image icon layer relative to the focusing element can manifest themselves to end-users as variations in the range of angles at which a particular synthetic image is projected to a viewer. In many applications utilizing a single icon layer, this variation in the viewing angle at which a particular synthetic image appears is a non-issue, or at most, a mild inconvenience, in that a user may have to "play around" with a security document to find a viewing angle at which a particular synthetic image appears. In the context of micro-optic security devices in which two or more icon layers are stacked, the aforementioned variations in registration translate into variations in the extent to which the colored icons of the icon layers are registered with one another. These variations in inter-icon layer registration can manifest themselves as muddy or "soft" changes in the synthetic image projected by the micro-optic security device over changes in ranges of viewing angle. For example, instead of the crisp switch from projecting first synthetic image 120 to second synthetic image 155 described with reference to the non-limiting example of FIGS. 1A-B, the micro-optic system may simultaneously project components of a first and second synthetic image across an intermediate range of angles. Depending on the extent and character of the inter-layer registration issues, the projected image may variously appear as a gradual color shift effect (as opposed to a defined "on-off," or "flicker" effect) or a muddy mixture of two or more colors, or as a visual cacophony wherein the different colors of the different icon layers are projected without any angular relationship to each other.

Figure 3A:
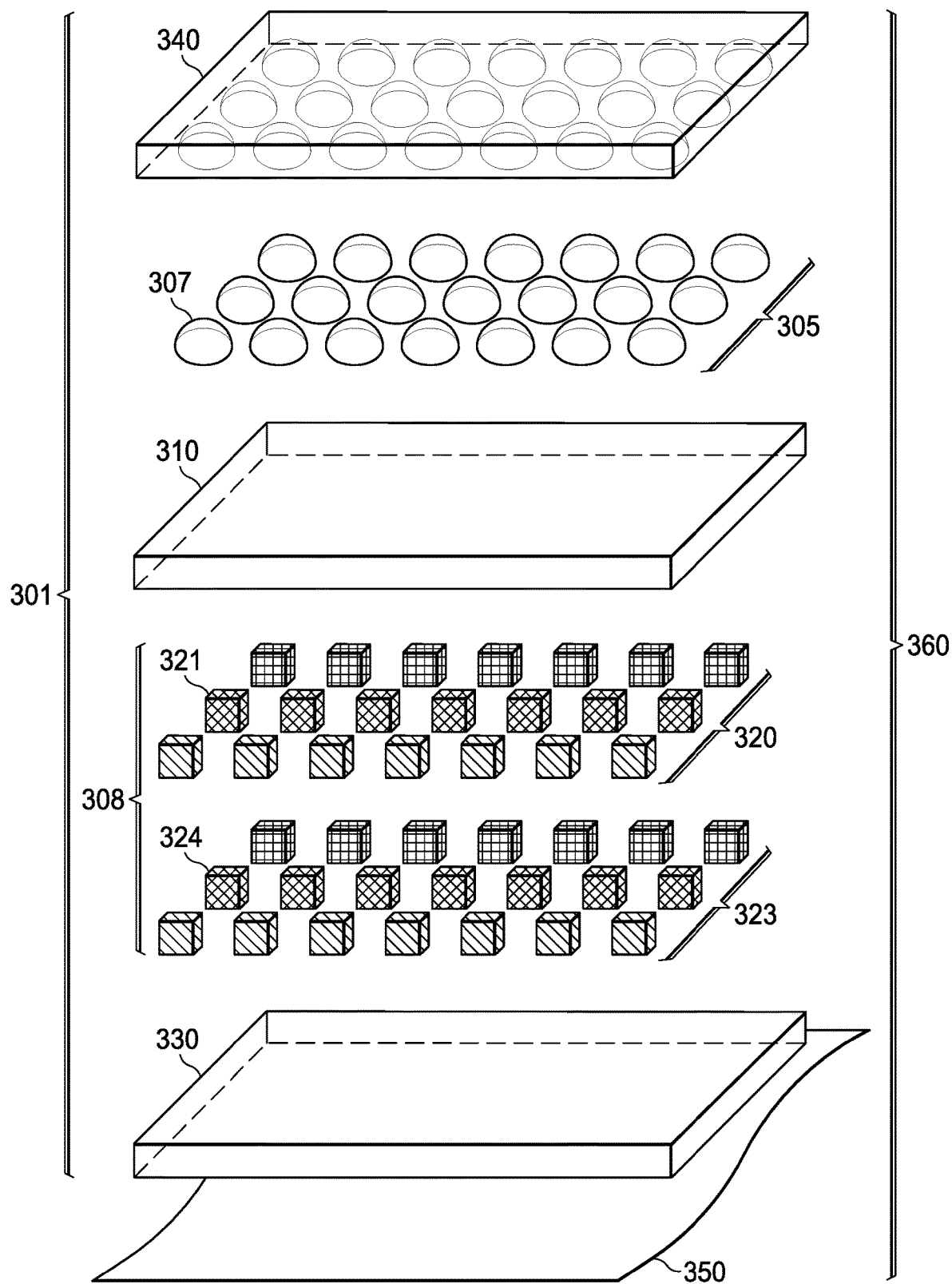
FIGS. 3A, 3B and 3C illustrate constructional aspects of micro-optic security devices according to some embodiments of this disclosure.
Figure 3B:
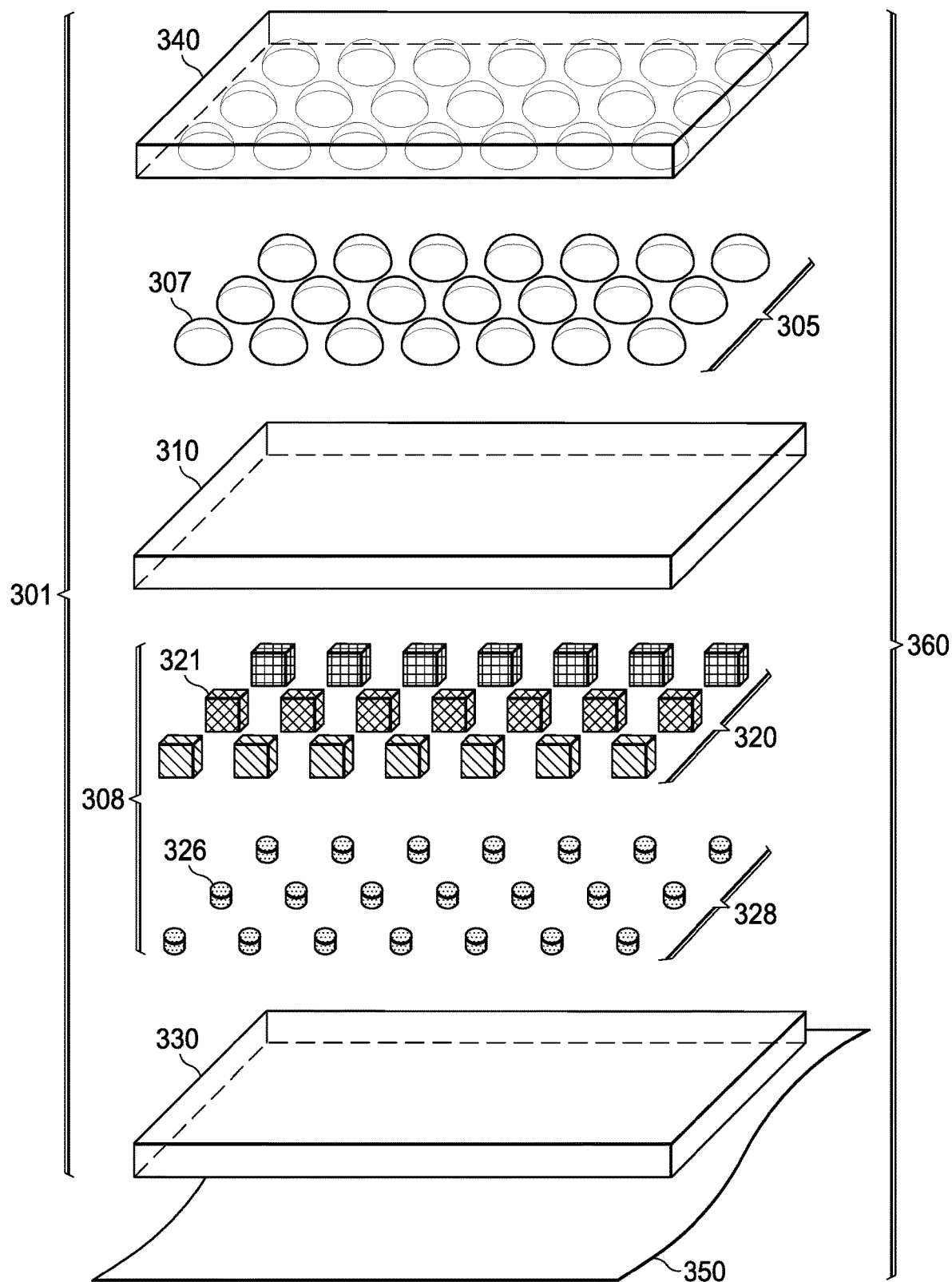
Figure 3C:
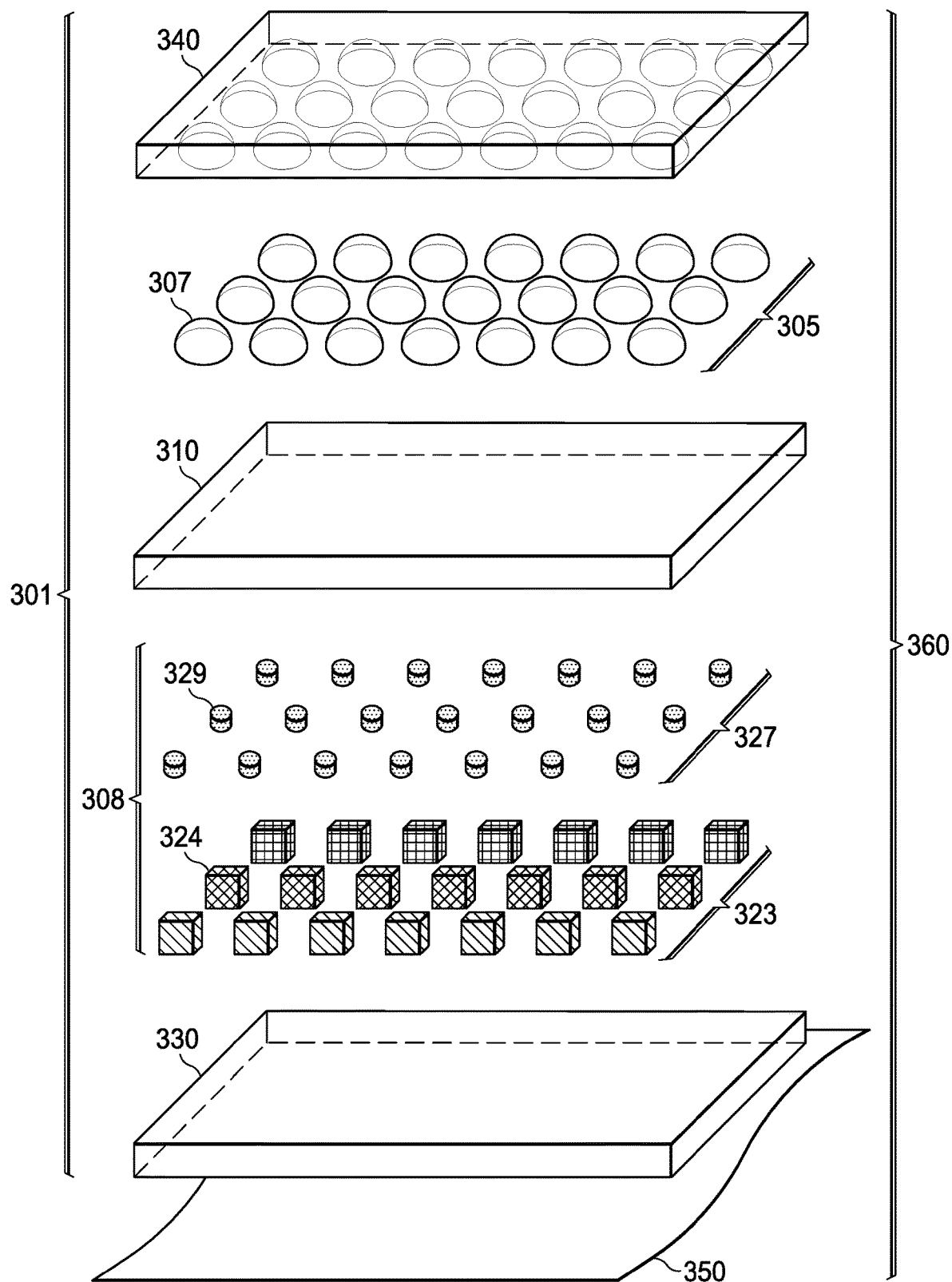

FIGS. 3A, 3B and 3C illustrate examples of micro-optic security devices and security documents with phase-aligned image layers, according to various embodiments of this disclosure. For convenience, structures which are common to one or more of FIGS. 3C through 3C are numbered the same.

Referring to the non-limiting example of FIG. 3A, an example of a micro-optic security device 301 according to various embodiments of this disclosure is shown in the figure.

Referring to the non-limiting example of FIG. 3A, micro-optic security device 301 comprises, at a fundamental level, a planar array of focusing elements 305 (including, for example, focusing element 307), and an icon layer stack 308 which comprises a first icon layer 320 (including, for example, image icon 321), and a second image icon layer 323 (including, for example, image icon 324). According to various embodiments, each focusing element of planar array of focusing elements 305 has a footprint. Further, planar array of focusing elements includes one or more cells which one or more image icons of arrangement of first icon layer 320, or second image icon layer 323 are located. Further, icon layer stack 308 includes at least one region in which colored image icons of the first icon layer 320 and colored image icons of the second image icon layer 323 are phase-aligned. In certain embodiments, the locations of the image icons (for example, image icons 321 or 324) correspond to locations within retaining structures made of substantially transparent material, such as UV curable resin, which is embossed and then cured to form an image icon layer having structures, such as voids, posts or mesas, in which colored material can be selectively deposited. According to some embodiments, the individual focusing elements of planar array of focusing elements 305 are disposed at one or more local repeat periods. As used in this disclosure, the term "local repeat period" encompasses an expression of how often a particular feature of a layer of micro-optic security device 301 repeats within a region of interest. As an example, the focusing elements of planar array of focusing elements 305 may have a local repeat period of 50 lenses per millimeter in one area, and 49 lenses per millimeter in a different portion of the system. Similarly, colored icons within first icon layer 320 may for example, have a local repeat period of 51 icons per millimeter in one portion of micro-optic security device 301, and a local repeat period of 49.5 icons per millimeter in a different region of micro-optic security device 301. By varying the ratio of the local repeat period of focusing elements to icon structures, aspects of the appearance of synthetic images of icon structures projected by the focusing elements can be tuned. For example, the apparent position of the synthetic image relative to the plane of micro-optic security device 301 can be changed through the ratio of the local repeat period of the focusing elements to the local repeat period of the icon structure, such that the synthetic image can appear to be floating above the plane of micro-optic security device 301, or positioned below the plane of micro-optic security device 301 (sometimes referred to as a "deep" or "superdeep" effect). Similarly, in certain embodiments, the ratio of the local repeat period of the focusing elements to the local repeat period of colored icon structures can, itself, by locally changed, to give synthetic image a more three-dimensional appearance.

According to certain embodiments, plurality of focusing elements 305 comprises a planar array of micro-optic focusing elements. In some embodiments, the focusing elements of planar array of focusing elements 305 comprise micro-optic refractive focusing elements (for example, plano-convex or GRIN microlenses), with a lensing surface providing a curved interface between regions of dissimilar indices of refraction (for example, a polymer lens material and air). Refractive focusing elements of planar array of focusing elements 305 are, in some embodiments, produced from light cured resins with indices of refraction ranging from 1.35 to 2.05, and have diameters ranging from 5 µm to 200 µm. In various embodiments, the focusing elements of planar array of focusing elements 305 comprise reflective focusing elements (for example, very small concave mirrors), with diameters ranging from 5 µm to 50 µm. While in this illustrative example, the focusing elements of planar array of focusing elements 305 are shown as comprising circular plano-convex lenses, other refractive lens geometries, for example, lenticular lenses, are possible and within the contemplated scope of this disclosure.

As shown in the illustrative example of FIG. 3A, first icon layer 320 comprises a set of image icons (including image icon 321), positioned at locations within the footprints of the focusing elements of planar array of focusing elements 305 associated with a range of directional curing angles. According to various embodiments, the individual image icons of first icon layer 320 comprise regions of directionally cured material in part or all spaces defined by retaining structures of a structured image icon layer formed from a substantially transparent material. As used in this disclosure, the term "structured image layer" encompasses a layer of substantially transparent material (for example, a light-curable resin) which has been embossed, or otherwise formed to comprise structures (for example, recesses, posts, grooves, or mesas) for positioning and retaining image icon material.

As shown in the illustrative example of FIG. 3A, in certain embodiments, micro-optic security device 301 includes an optical spacer 310. According to various embodiments, optical spacer 310 comprises a film of substantially transparent material which operates to position image icons of the one or more arrangement of image icons of icon layer stack 308 around the focal plane of focusing elements of planar array of focusing elements 305. In certain embodiments according to this disclosure, optical spacer 310 comprises a manufacturing substrate upon which one or more layers of light curable material can be applied, embossed and flood cured to form retaining structures In certain embodiments, the light-curable material used to form first icon layer 320 is a pigmented, ultraviolet (UV)-curable polymer. In various embodiments according to this disclosure, optical spacer 310 comprises an applied intermediate layer of a transparent UV-curable polymer (for example, a polymer used to make focusing elements of planar array of focusing elements 305) between the focusing elements and icon layer stack 308.

In certain embodiments according to this disclosure, micro-optic security device 301 comprises a seal layer 340. According to certain embodiments, seal layer 340 comprises a thin (for example, a 2 µm to 50 µm thick layer) of substantially clear material which interfaces on a lower surface, with focusing elements of the planar array of focusing elements 305, and comprises an upper surface with less variation in curvature (for example, by being smooth, or by having a surface whose local undulations are of a larger radius of curvature than the focusing elements) than the planar array of focusing elements 305.

As shown in the non-limiting example of FIG. 3A, in certain embodiments, micro-optic security device 301 can be attached, for example, by an adhesive layer 330, to a substrate 350, to form a security document 360 (for example, security document 105 in FIGS. 1A-B). According to various embodiments, substrate 350 can be a sheet of currency paper, or a polymeric substrate. According to some embodiments, substrate 350 is a thin, flexible sheet of a polymeric film, biaxially oriented polypropylene (BOPP). In various embodiments, substrate 350 is a section of a synthetic paper material, such as TESLIN®. According to some embodiments, substrate 350 is a section of a polymeric card material, such as a polyethylene terephthalate (PET) blank of a type suitable for making credit cards and driver's licenses. In certain embodiments, substrate 350 comprises a surface of a product, such as a bottle, a security document, or a high-value good, such as a smartphone or computer.

While FIG. 3A illustrates an example of a micro-optic security device 301 in which both first icon layer 320 and second image icon layer 323 are formed within a structured image icon layer constructed from substantially transparent material, embodiments according to this disclosure are not so limited. While the technology for creating tools for embossing thin layers of light curable materials to create retaining structures is mature and has been integrated with the tooling for large scale production of micro-optic security devices, other techniques for creating image icons are possible and can be used in conjunction with structured icon layers in micro-optic security devices with phase-aligned icon layers according to various embodiments of this disclosure. For example, in certain embodiments according to this disclosure, either the arrangement of image icons or the second arrangement of image icons can be produced using digital tooling methods. As used in this disclosure, digital tooling encompasses methods for manufacturing a constituent structure (for example, an image icon or focusing element) of micro-optic security device by defining control logic (for example, a G-CODE file for a printer) for the electronic tool used to form and place the constituent structure. As discussed in greater detail with reference to the illustrative example of FIGS. 5 and 8 of this disclosure, according to certain embodiments, image icons of either the first or second arrangements of image icons can be created as surface mounted icons using digital tooling.

As a further example of digital tooling according to various embodiments of this disclosure, one or more digitally controlled UV projectors can project patterns of ultraviolet light (for example, a mask file corresponding to all or part of a synthetic image to be projected by the micro-optic security device) onto a layer of transparent or colored uncured light curable material to create surface mounted image icons. In certain embodiments, the one or more UV projectors project the patterns ultraviolet light through a layer of focusing elements, thereby directionally curing portions of the uncured light-curable material. In various embodiments, instead of a digitally controlled UV projector, the pattern of UV light can be projected onto the uncured material by a rastered UV laser beam.

Referring to the non-limiting example of FIG. 3B, in this particular example, first image icon layer 320 has the same construction as in FIG. 3A, wherein image icons are formed as regions of colored material positioned within spaces defined by a retaining structure, which in this particular example, comprises a layer of an embossed and cured polymer layer. According to certain embodiments, the retaining structures within first icon layer 320 are filled with a light curable liquid material of a first color, and then directionally cured, such that a portion of the light curable material is cured into a solid state, while another portion of the light curable material remains in a liquid state and can be removed from the retaining structures, such as by washing.

As used in this disclosure, the term "directional curing" encompasses projecting structured or semi-structured light (for example, collimated light) in a pattern based on a synthetic image to be provided by the micro-optic security device, from a source (or plurality of sources) disposed at a location associated with a range of intended viewing angles for the synthetic image, towards the elements of the array of focusing elements, such that the light is focused by the focusing elements on uncured material occupying locations in the image icon layer associated with a viewing angle. In other words, and as described, for example, through the explanatory example of FIGS. 6A-6I of this disclosure, uncured material along the focal paths of light from a source associated with a range of viewing angles and focused by the focusing elements of an array of focusing elements (for example, planar array of focusing elements 305 in FIG. 3A is cured, while uncured material in locations outside of the focal paths of the directional cure light as focused by the focusing elements remains uncured.

According to certain embodiments, subsequent to washing the uncured material of the first color from retaining structures, further iterations of directionally curing materials of other colors, or associated with different viewing angles are performed. In the illustrative example of FIG. 3B, the final step in the formation of first icon layer 320 is filling in open spaces (e.g., areas not occupied by cured, colored material) with substantially transparent light curable material with little or no visible (to the human eye, at least. According to certain embodiments, layers of substantially clear material can be detected with imaging equipment, such as electron microscopes.)

Referring to the non-limiting example of FIG. 3B, according to certain embodiments, icons (for example, surface-mounted icon 326), or volumes of cured colored material of second icon layer 328, can be formed upon the surface of first icon layer 320 by at least two methods described herein.

According to certain embodiments, in one method of creating surface mounted icons on a surface of first icon layer 320, first icon layer 320 is formed by first creating a set of retaining structures, such as by embossing and then flood-curing a layer of light curable polymer. In various embodiments, at a second step, the retaining structures are then filled with uncured substantially transparent light-curable material, the excess of which is doctor bladed off of the retaining structures, with the material in the retaining structures directionally cured using a pattern of directionally cured light associated with a first range of viewing angles, to create regions within first icon layer 320 of cured substantially transparent material associated with a first range of viewing angles. Subsequently, uncured substantially transparent light curable material is washed from the retaining structures, and the still available retaining structures are filled or coated with uncured light curable material of a first color, the excess of which is doctor bladed off of the retaining structures, with the remaining material being flood cured to complete first icon layer 320, having a substantially flat exterior surface distal to planar array of focusing elements 305. According to certain embodiments, uncured light material of a second color is applied to the exterior surface and directionally cured using the light associated with the first range of viewing angles as in the second step of forming first icon layer 320. Subsequent to directional curing, the uncured light-curable material of the second color is washed from the exterior surface, with surface mounted icons of a second icon layer 328 remaining on the exterior surface of first icon layer.

According to certain embodiments, another method of forming a second icon layer 328 of surface-mounted image icons comprises creating first icon layer 320 as described above, and applying a layer of uncured light curable material of a second color. The uncured light curable material of the second color is directionally cured using patterned light at a complementary angle to the first range of angles at which the material of the first color was cured. In this way, a controlled separation between the range of angles at which synthetic images of the colored material of the first color are projected through the focusing elements and the range of angles at which synthetic images of the colored material of the second color are projected through the focusing elements can be achieved.

FIG. 3C illustrates an example of a micro-optic security device 301 according to various embodiments of this disclosure.

Further to the illustrative example of FIG. 3B, which illustrated an example of a micro-optic security device according to this disclosure, wherein an image icon layer comprising surface-mounted icons is distal to the array of focusing elements, relative to another image icon layer comprising a plurality of substantially transparent retaining structures, FIG. 3C illustrates an example of a micro-optic security device 301, wherein a layer of surface mounted image icons is proximate to the focusing elements, relative to an icon layer comprising substantially transparent retaining structures.

Referring to the non-limiting example of FIG. 3C, first icon layer 327 comprises a plurality of surface-mounted image icons (including surface-mounted image icon 329) formed on a side of optical spacer 310 by directionally curing a layer of uncured pigmented material of a first color with pattern of a light associated with a first synthetic image from a structured light source positioned to provide light across a first range of viewing angles. In this illustrative example, subsequent to directional curing, the uncured material of the first color is removed, optionally, subsequent sets of surface-mounted icons, associated with different colors or different viewing angles are formed through directionally curing material of the first or other colors. Uncured colored material is removed from the surface of optical spacer 310, and a layer of substantially clear material is applied to fill in the spaces between the surface-mounted image icons, and to create a flat surface upon which second image icon layer 323 can be formed as an image icon layer comprising retaining structures. According to various embodiments, the layer of substantially clear material is applied such that substantially clear material of first icon layer 327 is integral with the retaining structures of second image icon layer 323.

In some embodiments, the retaining structures of second image icon layer 323 are filled with uncured light curable material of a second color, which is then doctor bladed to remove excess uncured material. The uncured light curable material of the second color is directionally cured with a pattern of light associated with the first range of viewing angles, and the uncured material of the second color is washed out. Depending on the number of layers specified for icon layer stack 308, in some embodiments, the process of manufacturing icon layer stack 308 can end here, without any further filling/curing operations.

Figure 4A:
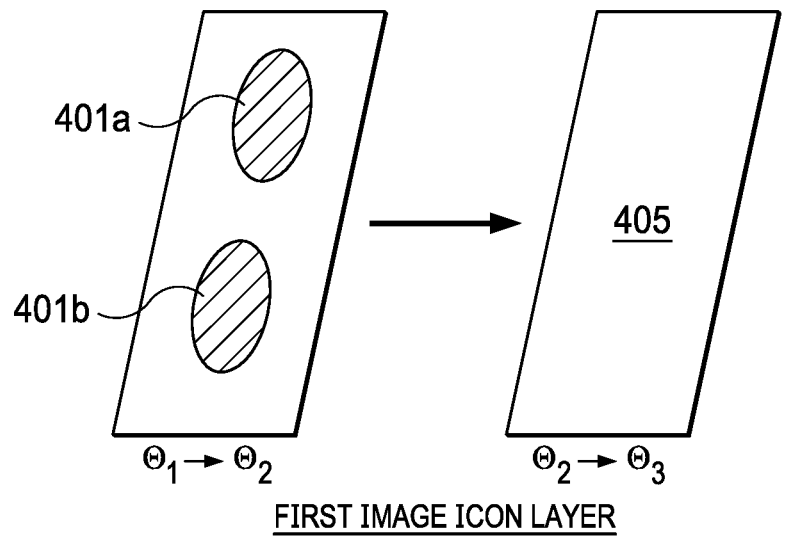
FIGS. 4A and 4B illustrate aspects of the contributions of individual stacked icon layers of a micro-optic security device according to certain embodiments of this disclosure.
Figure 4B:
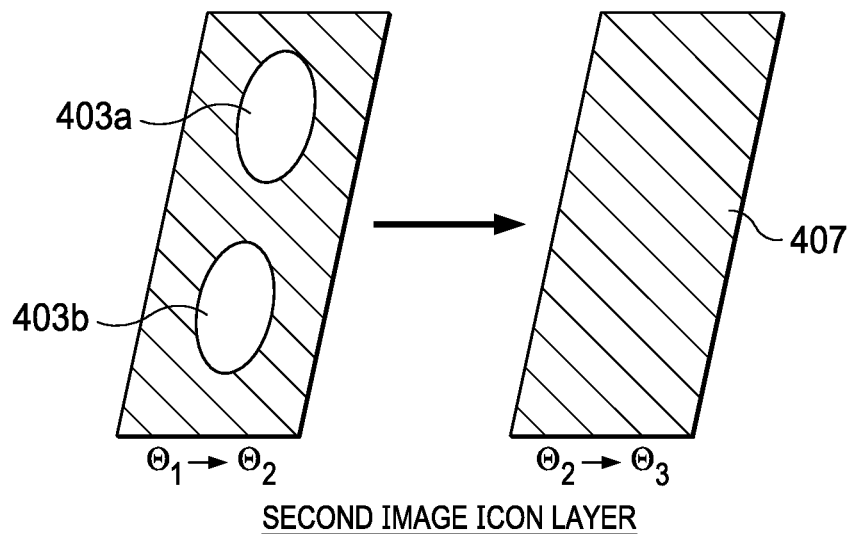

FIGS. 4A and 4B illustrate aspects of the contributions of stacked icon layers of a micro-optic security device (for example, micro-optic security device 110 in FIGS. 1A-B) according to various embodiments of this disclosure. Micro-optic security devices according to various embodiments of this disclosure comprise icon layer stacks, which are magnified by an array of focusing elements to project synthetic images which provide distinctive and engaging optical effects, including, without limitation multi-color synthetic images, with tight control over the range of viewing angles at which each layer of the icon layer stack contributes to the synthetic image provided by the micro-optic security device. As discussed elsewhere herein, micro-optic security devices according to some embodiments of this disclosure comprise icon stacks with image icon layers that are phase-aligned.

Referring to the illustrative example of FIGS. 4A-B, the contributions of a first image icon layer (for example, first icon layer 320 in FIG. 3A) and a second image icon layer (for example, second icon layer 328 in FIG. 3B) to synthetic images projected by the system across a first range of viewing angles ($\Theta_1 \rightarrow \Theta_2$) and a second range of viewing angles ($\Theta_2 \rightarrow \Theta_3$) are shown in the figure. For convenience of cross-reference, the synthetic images projected by the micro-optic security device to a viewer in the example of FIG. 4 correspond to the synthetic images shown in the illustrative example of FIGS. 1A-B. That is, when viewed at angles within the first range of viewing angles, the micro-optic device projects a pair of ovals of a first color on a background of a second color. In this non-limiting example, the viewing angle crosses from the first range of viewing angles to the second range of viewing angles, the colored ovals "switch off" and are replaced with a synthetic image of the second color, thanks to phase alignment between icons of a first image icon layer, which contains image icons of the first color, and icons of a second image icon layer, which contains image icons of the second color.

As shown in FIGS. 4A-B, when the micro-optic security device is viewed at angles within first range of viewing angles ($\Theta_1 \rightarrow \Theta_2$), the focusing elements of the device project areas of the first icon layer comprising directional volumes of cured material of the first color, such that the first image icon layer contributes the regions visible in the synthetic image as first oval 401a and second oval 401b. According to certain embodiments, in addition to directionally curing uncured material of the first color in the first icon layer in the pattern associated with ovals 401a and 401b, uncured substantially transparent material in the second icon layer is also directionally cured in the pattern associated with ovals 401a and 401b, excluding colored material of the second color from the focal paths associated with the first range of viewing angles, and ensuring that the corresponding regions 403a and 403b of the second icon layer do not cross-talk or otherwise interfere with the regions of the first icon layer producing ovals 401a and 401b.

Similarly, for second range of viewing angles ($\Theta_2 \rightarrow \Theta_3$), in certain embodiments, uncured substantially transparent material is applied to the first layer and directionally cured from a light source associated with the second range of viewing angles, thereby ensuring that the contribution 405 of the first icon layer to the synthetic image projected by the micro-optic security device in the second range of viewing angles is none. That is, in some embodiments, there is no colored material in the first icon layer in locations associated with focal paths of light passing into or out of the micro-optic security device along angles associated with the second range of viewing angles.

Additionally, for second range of viewing angles ($\Theta_2 \rightarrow \Theta_3$), in various embodiments according to this disclosure, volumes of uncured material of a second color are directionally cured with structured light provided from sources associated with the second range of viewing angles. As such, in second range of viewing angles, the second image icon layer projects a synthetic image 407 whose components are solely drawn from the second image icon layer.

While FIGS. 4A-B have been described with reference to a micro-optic security device providing a single "flicker" effect produced by directionally curing colored material of a first color in a layer of an icon layer stack, and directionally curing uncolored material of in a second icon layer at the same range of viewing angles, embodiments according to this disclosure are not so limited. For example, in certain embodiments, the techniques for achieving control over the phasing of the icon layers, and the viewing angles at which colored material of each layer of an image icon stack contribute to a synthetic can be applied to produce different effects. For example, in certain embodiments, one portion of a synthetic image may exhibit phase alignment, such as described with reference to FIG. 4, wherein one color "shuts off" immediately after the viewing angle moves outside of the first range of viewing angles, while a different portion of the synthetic image exhibits a slight phase misalignment, wherein the color changes with viewing angle. Additionally, in certain embodiments, and as discussed with reference to FIG. 3B, phase alignment between colored material in the first image icon layer and colored material in the second image icon layer can be achieved by directionally curing uncured material in the second image icon layer at a complementary range of viewing angles to the first range of viewing angles used to directionally cure colored material in the first image icon layer.

Figure 5C:
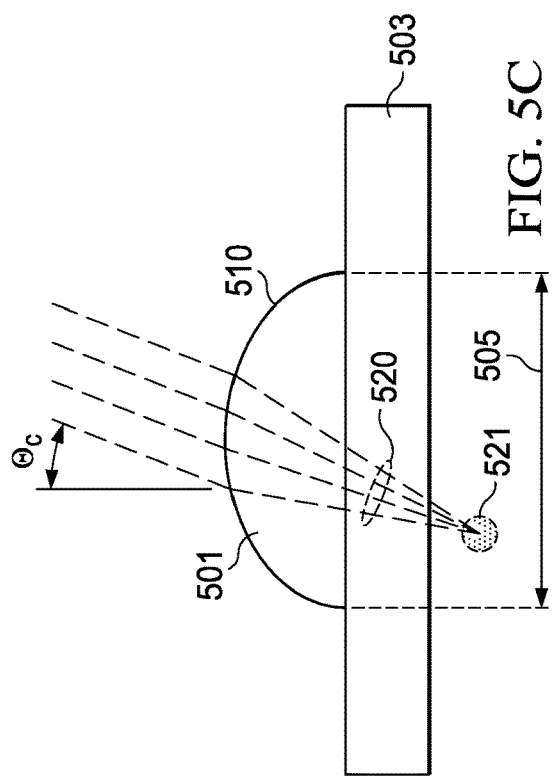
FIGS. 5A-5C illustrate from multiple viewpoints, an example of aspects of forming a surface-mounted image icon according to some embodiments of this disclosure.
Figure 5B:
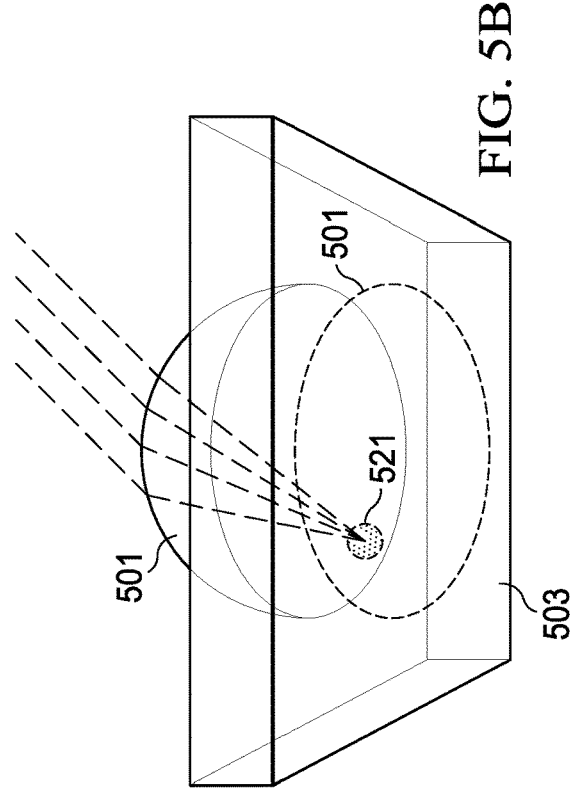
Figure 5A:
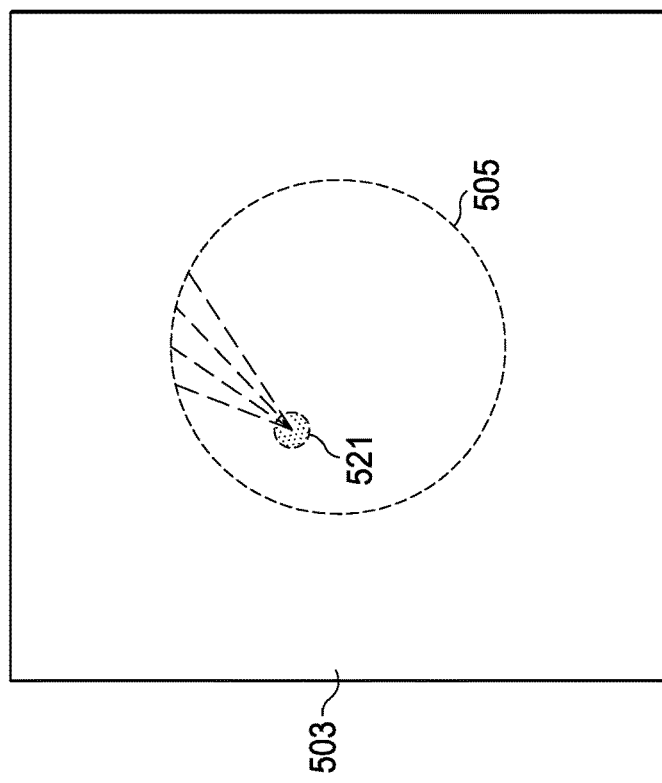

FIGS. 5A-5C illustrate, from multiple viewpoints, aspects of forming a surface-mounted image icon in a cell of a micro-optic security device, according to certain embodiments of this disclosure.

To form a surface-mounted image icon in certain embodiments according to this disclosure, structured light is projected from projection angles corresponding to predetermined range of viewing angles at the lensing surfaces of focusing elements of a planar array of focusing elements, wherein the structured light is focused by the focusing elements of the planar array of focusing elements upon regions of uncured light-curable material within the footprints of the focusing elements of the planar array of focusing elements. Subsequently, the uncured light-curable material is removed (for example, with a spray wash) or chemically deactivated, such that only the cured regions of the light curable material are visible through the focusing elements at the predetermined range of viewing angles. In this way, a cured volume of colored material (for example, an image icon), or substantially transparent material (for example, to exclude colored material from a location where it would interfere with the contribution of a colored icon in another layer of the icon layer stack) can be formed on a surface of the micro-optic security device.

Referring to the non-limiting example of FIGS. 5A-C, a side view (FIG. 5C), an underside view (FIG. 5A) and an angled view (FIG. 5B) of a refractive focusing element 501, which is positioned on a portion of an optical spacer 503 are provided. In this illustrative example, a lensing surface 510 of focusing element 501 defines a curved boundary between regions of different indices of refraction (for example, air, and a polymer with a refractive index of greater than 1) which guides a cure light to a location within the footprint of the lens, where it cures a volume of light curable material of a first color to form surface-mounted image icon 521.

According to certain embodiments, focusing element 501 is affixed to optical spacer 503 and has a fixed relationship to the surfaces of optical spacer 503. In certain embodiments, the fixed relationship between focusing element 501 and the surfaces of optical spacer 503 is achieved by applying a layer of light-curable material to optical spacer 503, embossing the layer of light-curable material to form a lensing surface and curing the material in situ. In some embodiments, the fixed relationship between focusing element 501 and the surfaces of optical spacer 503 is achieved by forming both focusing element 501 and optical spacer from a common layer of light-curable material, and curing the formed layer to create an integrated focusing element-optical spacer combination.

Focusing element 501 is associated with a footprint 505, defining a region in which focusing element 501 can focus light with sufficient sharpness that image icons can be projected by focusing element 501. As shown in the example of FIGS. 5A-C, footprint 505 can be a three-dimensional region of space, thereby allowing icons of multiple layers of an icon layer stack to occupy space in footprint 505. According to some embodiments, footprint 505 is coextensive with the perimeter of focusing element 501. According to some embodiments, footprint 505 is smaller than the perimeter of focusing element 501. In certain embodiments, footprint 505 describes an area which is larger than the perimeter of focusing element 501.

As shown in the illustrative example of FIGS. 5A-C, structured light (for example, collimated light, light from a projector, or light which has been passed through another array of focusing elements) associated with a synthetic image such as the cell shown in FIGS. 5A-C, is projected at the lensing surface of focusing element 501 at an angle (or a range of angles) associated with a predetermined viewing angle, which is shown in the figure as $\Theta_c$. The lensing action of focusing element 501 focuses the incident along a focal path 520 within footprint 505. By applying a layer of uncured light-curable colored (or substantially transparent light-curable) material to the bottom surface of optical spacer 503 prior to applying the structured light to the system, the subsequent application of structured light causes the portions of light curable material in focal path 520 to cure, while portions of light curable material outside focal path 520 remain uncured and can be removed. Accordingly, a surface-mounted image icon 521 can be formed on surfaces within footprint 505 of focusing element 501.

FIGS. 6A through 6I illustrate constructional aspects of a micro-optic security device according to various embodiments of this disclosure. For convenience of cross-reference, elements which are common to more than one of FIGS. 6A through 6I are numbered similarly.

Figure 6A:
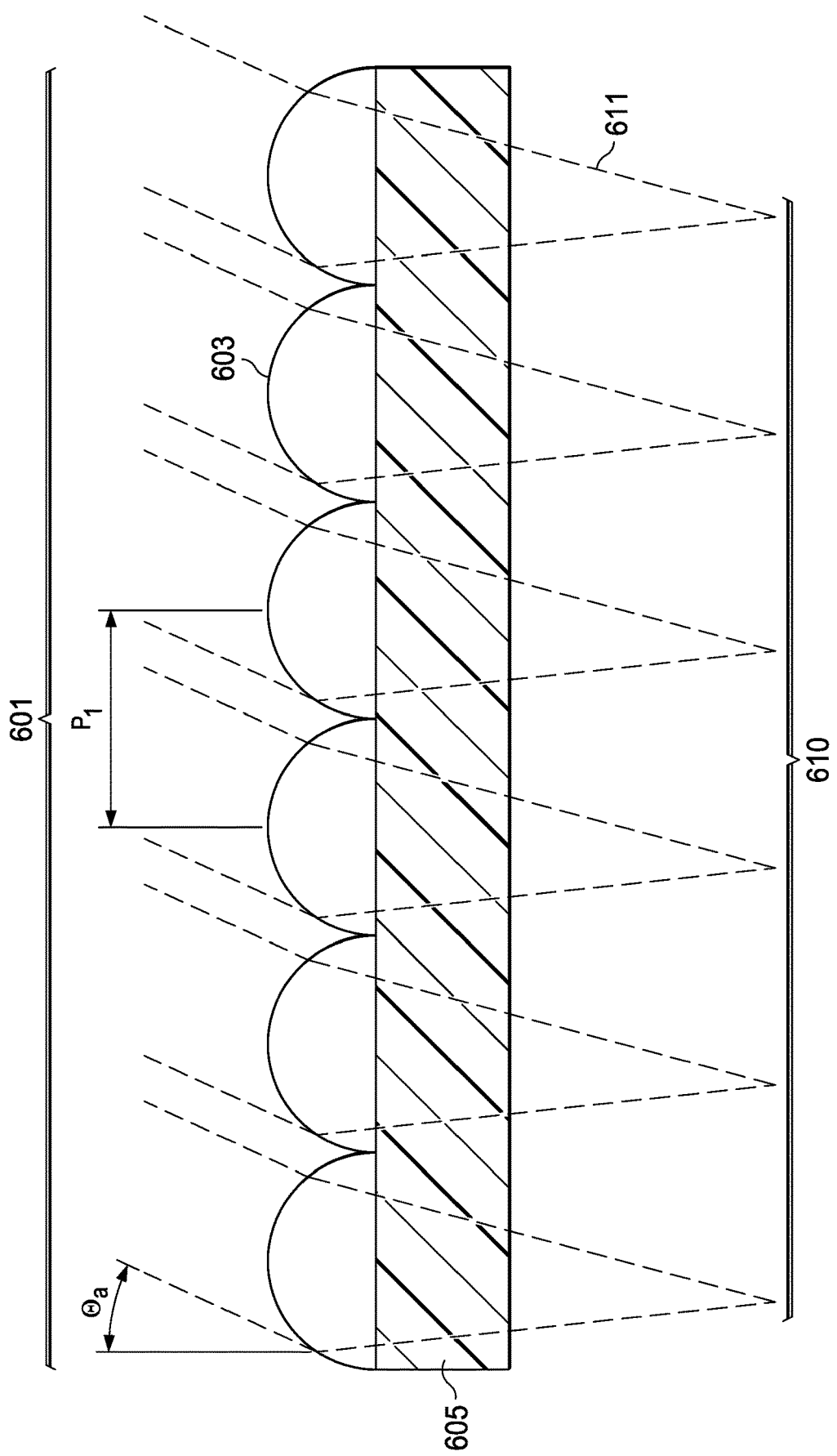
FIGS. 6A through 6I illustrate constructional aspects of micro-optic security devices according to various embodiments of this disclosure.

Referring to the non-limiting example of FIG. 6A, a section of planar array of focusing elements 601 of a micro-optic security device according to certain embodiments of this disclosure is shown in the figure. In some embodiments, such as shown in the figure, the focusing elements of planar array of focusing elements 601 are plano-convex microlenses. In some embodiments, the focusing elements of planar array of focusing elements 601 are reflective focusing elements, or different refractive structures (for example, GRIN lenses). As shown in the figure, the focusing elements of section planar array of focusing elements 601 have a local repeat period $P_1$, corresponding to the distance over which the pattern of similarly sized focusing elements repeats in the section of planar array of focusing elements 601 shown in the figure.

In certain embodiments, light projected upon planar array of focusing elements 601 at an angle $\Theta_a$, or range of viewing angles comprising $\Theta_a$, is focused by the constituent elements of planar array of focusing elements 603, and passes through optical spacer 605 and subsequent layers (for example, an icon layer stack) of the micro-optic security device along plurality of focal paths 610 (including, for example, focal path 611).

According to certain embodiments, micro-optic security devices comprise an optical spacer 605, comprising a sheet of substantially transparent material, such as a polyethylene or polyester film, upon which the focusing elements and an icon layer stack (for example, icon layer stack 308 in FIG. 3A) can be formed. According to some embodiments, optical spacer 605 comprises an intermediate layer of a substantially transparent, light curable polymer used to create other structures of the micro-optic security device, such as planar array of focusing elements 601. In various embodiments according to this disclosure, optical spacer 605 comprises a section of biaxially oriented polypropylene (BOPP), polycarbonate, polyvinyl chloride (PVC), or polyethylene terephthalate (PET) film.

Figure 6B:
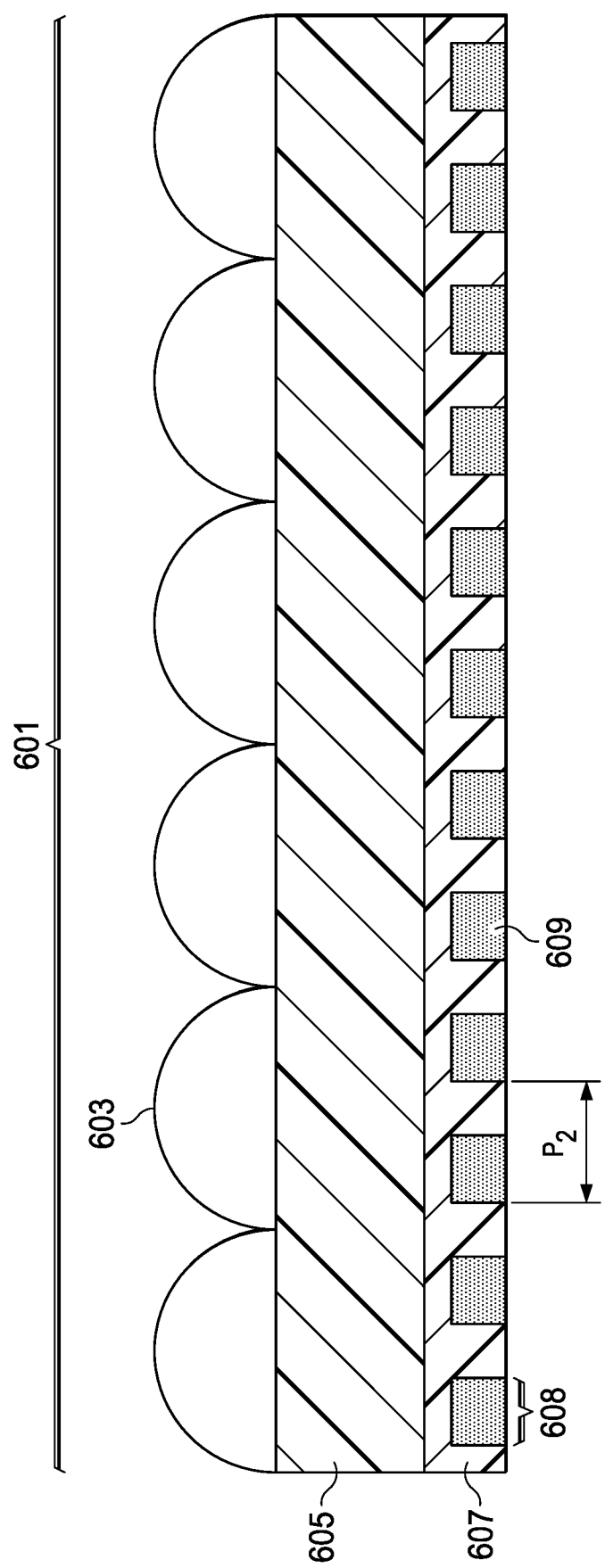

FIG. 6B illustrates constructional aspects of a micro-optic security device according to certain embodiments of this disclosure. Referring to the illustrative example of FIG. 6B, an initial step in the creation of a first icon layer of an icon layer stack (for example, icon layer stack 308 in FIG. 3A) is shown in the figure. According to certain embodiments, a plurality of retaining structures 607 is formed on the underside of optical spacer 605. In this explanatory example, plurality of retaining structures 607 comprises a set of reliefs, or recesses formed in a layer of substantially transparent material (shown with dotted fill in the figure). As shown in the figure, plurality of retaining structures 607 have a local repeat period $P_2$ in the section of the micro-optic security device shown in FIG. 6B. In certain embodiments according to this disclosure, the local repeat period $P_2$, of the retaining structures of the first icon layer of the icon layer stack varies across icon layer, so that the components of synthetic images projected by the first icon layer appear at different heights relative to the physical surface of the micro-optic security device.

According to some embodiments, plurality of retaining structures 607 are filled with uncured light-curable material of a first color 609.

Figure 6C:
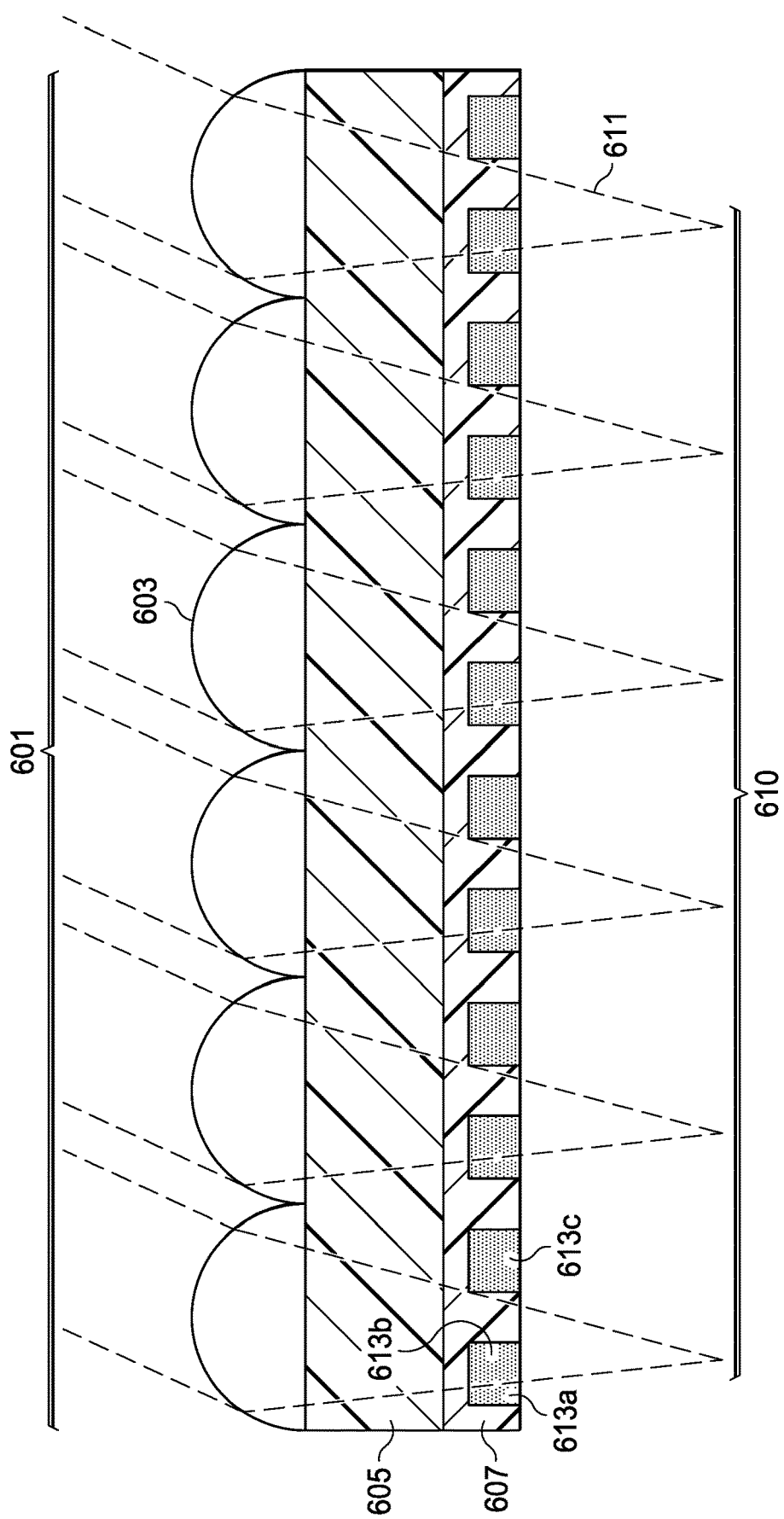

FIG. 6C illustrates constructional aspects of a micro-optic security device according to certain embodiments of this disclosure.

Referring to the non-limiting example of FIG. 6C, structured light associated with the component of a synthetic image to be projected by the first image icon layer of the image icon stack is projected at planar array of focusing elements 601, and passes through optical spacer 605, plurality of retaining structures 607 and the volumes of uncured light curable material of the first color 609. As shown in this non-limiting example, the focal paths of the light passing through optical spacer 605 do not encompass all of the volumes of uncured light material of the first color. For example, of the light curable material of the first color 609 within first retaining structure 608, a first portion 613a lies outside of focal path 611, while a second portion 613b falls within focal path 611. According to some embodiments, first portion 613a is not cured by cure light passing along focal path 611, while second portion 613b, which lies within focal path 611, is cured by the light passing through along focal path 611. Similarly, a third volume of light curable material of the first color 613c, lies completely outside of focal path 611 and the adjacent focal path and remains uncured.

Figure 6D:
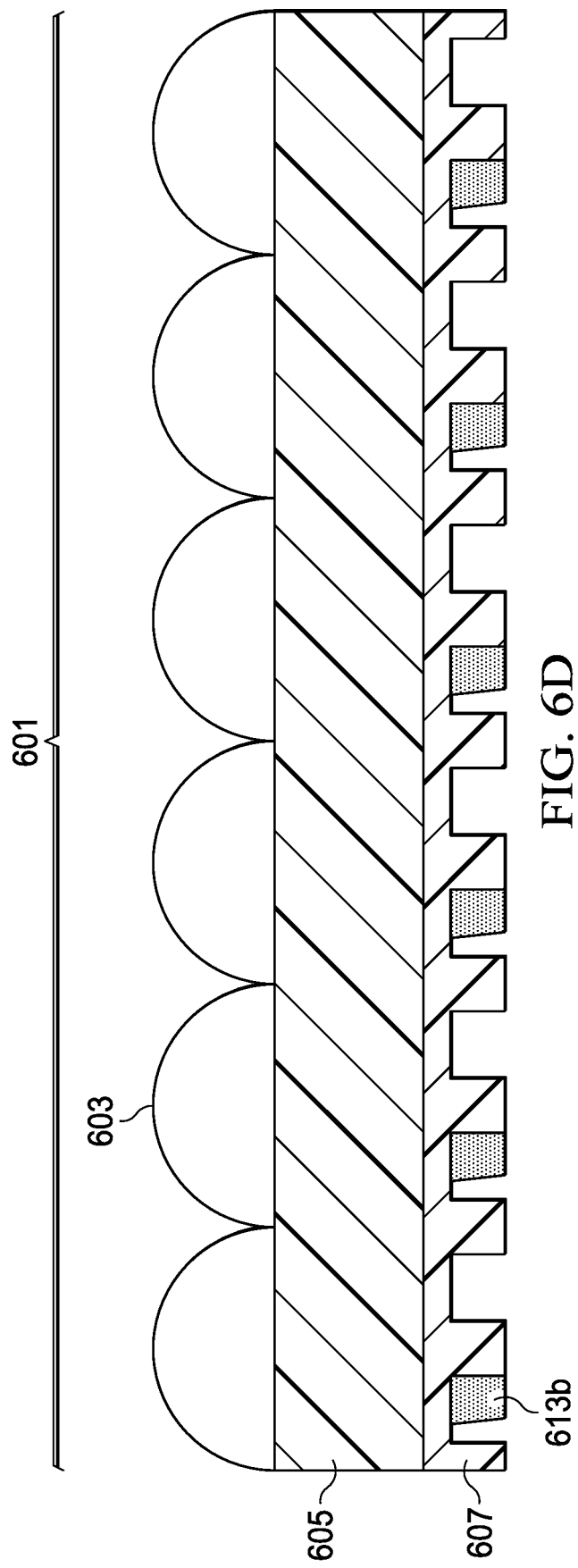

FIG. 6D illustrates constructional aspects of a micro-optic security device according to various embodiments of this disclosure.

As shown in this illustrative example, after directionally curing the light curable material of the first color with structured light from a first range of viewing angles (for example, the light travelling along plurality of focal paths 610 in FIG. 6C, the uncured material is removed from the plurality of retaining structures 607, leaving only volumes of cured material of the first color in the spaces of plurality of retaining structures 613 which were in focal paths 611. For example, while volumes of uncured material of portions 613a and 613c, were removed subsequent to directional curing, second portion 613b remains in place in the plurality of retaining structures 607.

Figure 6E:
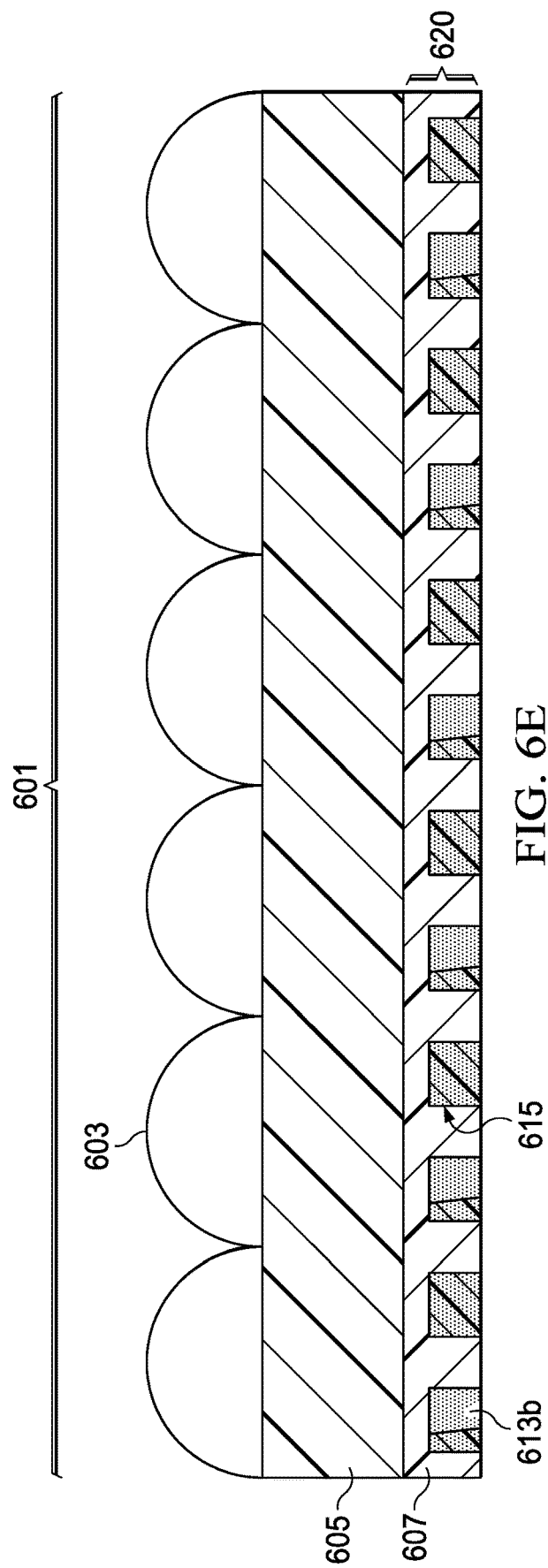

FIG. 6E illustrates constructional aspects of a micro-optic security device according to some embodiments of this disclosure. Referring to the illustrative example of FIG. 6E, to help "lock in" the volumes of cured material (for example, second portion 613b) to locations within plurality of retaining structures 607 associated with specific focal paths (for example, focal paths 611 in FIG. 6C), the remaining unfilled regions of retaining structures 607 are filled with substantially transparent material (for example, a UV-curable polymer suitable for embossing and curing to form planar array of focusing elements 601). According to certain embodiments, the substantially transparent material added to the retaining structures to fill in spaces not already filled by directionally cured material creates interface regions (for example, interface region 615) between the substantially transparent retaining structures and the additional substantially transparent material. While not visible to the human eye, the interface region comprising the boundaries between these areas of substantially transparent material are visible under an electron microscope.

In certain embodiments according to this disclosure, the addition of substantially transparent material in the unfilled regions of plurality of retaining structures 607 completes the construction of the first icon layer 620, upon which second or more icon layers of an icon layer stack can be formed.

Figure 6F:
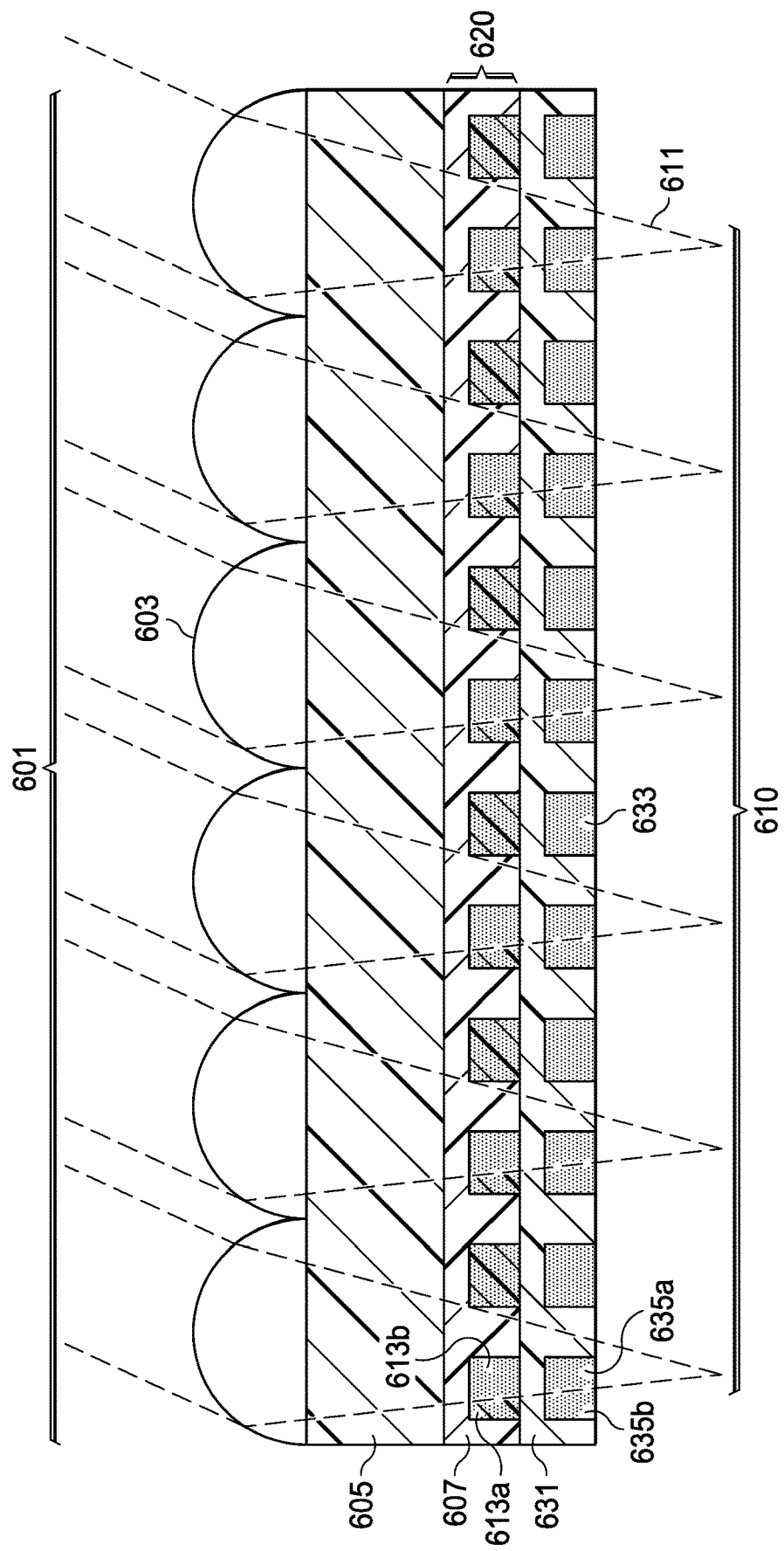

FIG. 6F illustrates constructional aspects of a micro-optic security device according to various embodiments of this disclosure.

According to certain embodiments, a second layer of a multi-layer (i.e., two layers or more) icon layer stack is formed on a surface of first icon layer 620 distal to planar array of focusing elements 601. As shown in the non-limiting example of FIG. 6F, a second plurality of retaining structures 631 are formed (for example, by embossing and subsequently curing a layer of substantially transparent UV curable material) on the surface of first icon layer 620 distal to planar array of focusing elements 601.

Referring to the non-limiting example of FIG. 6F, the recesses of second plurality of retaining structures 631 are filled with volumes of uncured substantially transparent light-curable material 633. Uncured substantially transparent light-curable material 633 is then directionally cured with light, which like the light used to cure the light curable material of the first color in first icon layer 620, travels through the structures of the icon layer stack along plurality of focal paths 610. As shown in the example of FIG. 6F, the volumes of uncured substantially transparent light-curable material are cured at locations within second plurality of retaining structures 631 which coincide with focal paths of plurality of focal paths 610. For example, the light curable material occupying of first volume 635a is cured by the light traveling along focal path 611, while the light curable material occupying location 635b, which lies outside focal path 611, remains uncured.

Figure 6G:
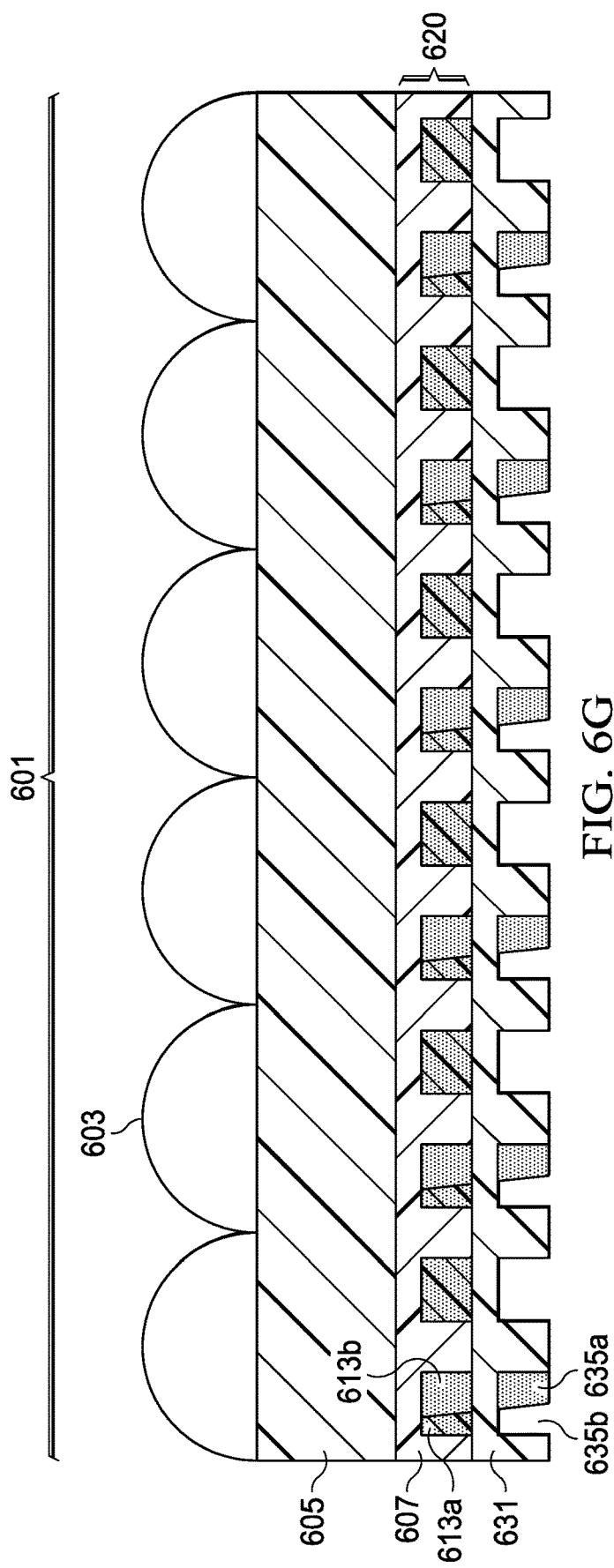

FIG. 6G illustrates constructional aspects of a micro-optic security device according to certain embodiments of this disclosure. According to certain embodiments, the uncured substantially transparent light-curable material 633 in second plurality of retaining structures 631 is removed. As the substantially transparent light-curable material is cured in locations associated with the first range of viewing angles (e.g., locations on plurality of focal paths 610), additional material (for example, light curable material of a second color) can only be added to second plurality of retaining structures in locations associated with viewing angles outside of focal paths of light passing through the icon layer stack along the first plurality of focal paths. In this way, certain embodiments according to this disclosure can achieve phase-alignment between colored icons in different icon layers. Put differently, in various embodiments according to this disclosure, the volumes of cured substantially transparent material in second plurality of retaining structures 631 occupy locations, which if accessible to material of other colors, could cross-talk with the cured volumes of colored material in first icon layer 620 (for example, second portion 613b). However, the volumes of cured substantially transparent material (for example, first volume 635a) operate to exclude colored material from plurality of focal paths 610.

Figure 6H:
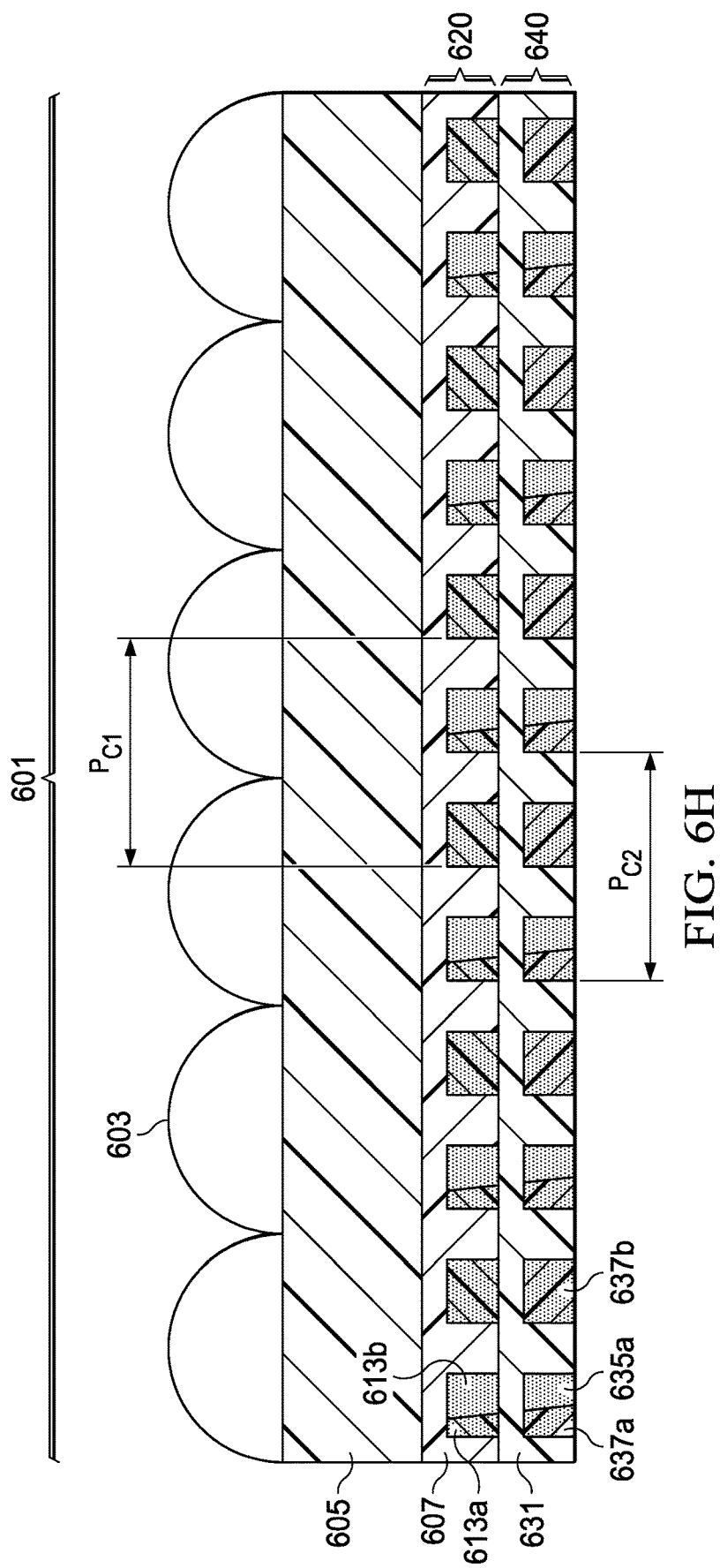

FIG. 6H illustrates constructional aspects of a micro-optic security device according to various embodiments of this disclosure.

Referring to the non-limiting example of FIG. 6H, after directionally curing volumes of uncured substantially transparent light curable material 633 and removing the uncured material outside of plurality of focal paths 610, the unfilled spaces of second plurality of retaining structures 631 (i.e., locations associated with focal paths of ranges of viewing angles other than the first range of viewing angles) are filled with volumes of uncured material of a second color, and cured to create volumes of cured material of the second color (for example, first volume 637a and second volume 637b). In this way, a second icon layer 640 is formed on top of first icon layer 620.

As shown in the illustrative example of FIG. 6H, the volumes of cured material of the first color are disposed at a local repeat period $P_{C1}$ in the small section of the micro-optic security device shown in the figure, and the volumes of cured material of the second color are disposed at a local repeat period $P_{C2}$ in the sliver of micro-optic security device shown in FIG. 6H. In certain embodiments according to this disclosure, the local repeat periods of cured volumes of material of the first color and cured volumes of the second color may vary across the space of the micro-optic security device.

While micro-optic security devices according to various embodiments of this disclosure have been described in FIGS. 6A-6H with reference to a system comprising only two layers and two colors, embodiments according to the present disclosure are not so limited, and further embodiments, wherein the icon layer stack comprises additional layers, and each layer comprises volumes of cured material of multiple colors associated with multiple viewing angles, are possible and within the contemplated scope of this disclosure. Put differently, the operational and constructional aspects of the micro-optic security system of FIG. 6H are scalable across multiple dimensions, including icon colors, number of icon layers, and number of ranges of viewing angles associated with specific synthetic images.

Figure 6I:
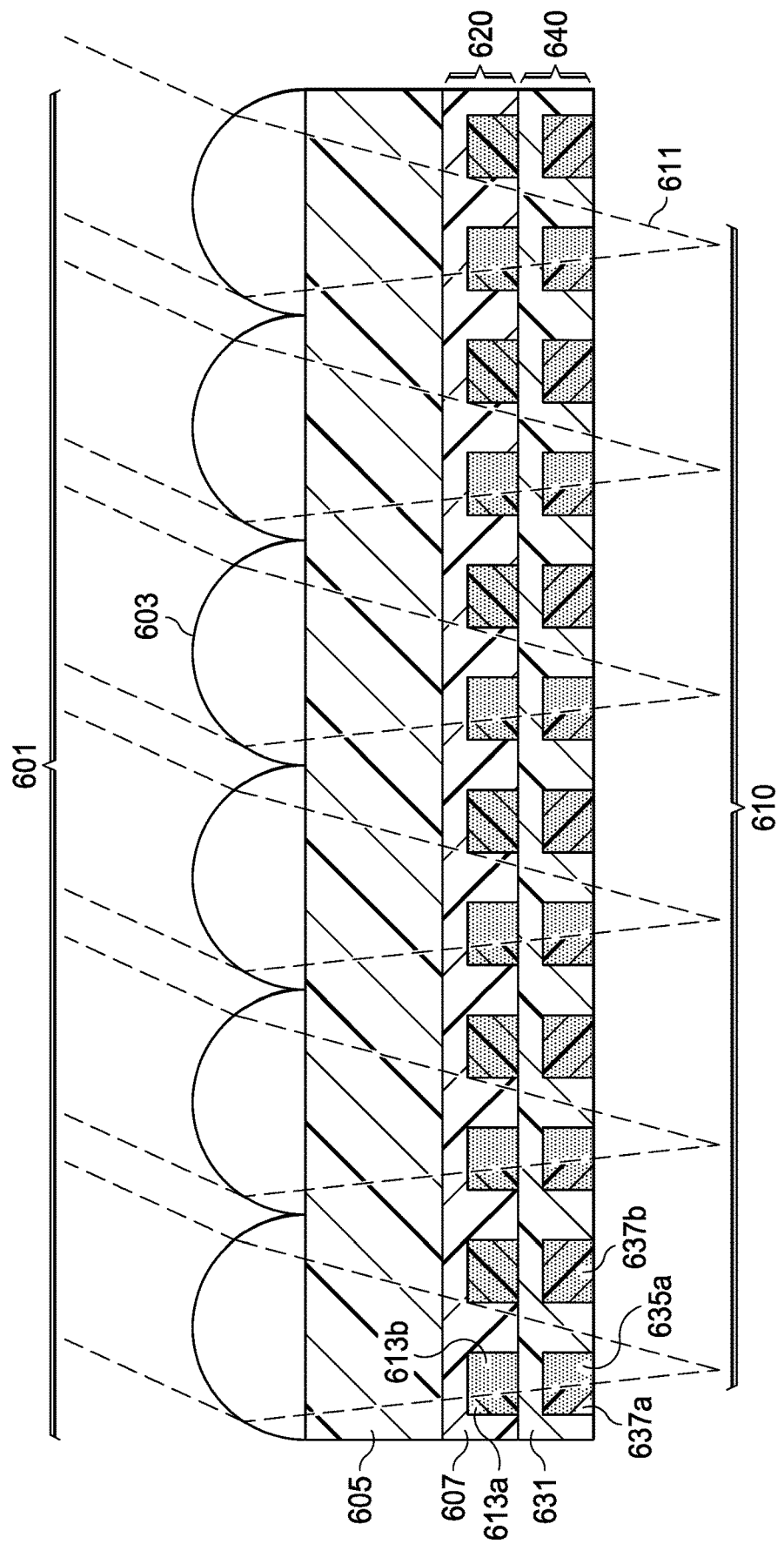

FIG. 6I illustrates constructional aspects of micro-optic security devices according to various embodiments of this disclosure.

Referring to the non-limiting example of FIG. 6I, the structures illustrated in the example of FIG. 6H are shown again, only with the plurality of focal paths 610 superimposed on the figure to help illustrate how cured volumes of material of the first color in first icon layer 620 are phase-aligned with cured volumes of material of the second color in second icon layer 640.

In the illustrative example of FIGS. 6A through 6I, a synthetic image of the first color flickers, or "turns on" abruptly when the viewing angle enters the range of viewing angles associated with plurality of focal paths 610, and "turns off" abruptly when the viewing angle exits the range of viewing angles associated with plurality of focal paths 610, at which point a second synthetic image of the second color is projected by the micro-optic system is presented. Thus, in certain embodiments according to this disclosure, the on-off period of the first icon layer is phased to the off-on period of the second icon layer. According to various embodiments, this synchronicity between the appearance of the synthetic image projected by first icon layer 620 and the disappearance of the synthetic image projected by second icon layer 640 is facilitated by phase alignment of the volumes of cured material of the first color in the first layer and the volumes of cured material of the second color in the second layer. FIG. 6I provides a non-limiting example of such phase alignment.

As shown in FIG. 6I, second portion 613b of first icon layer 620 is bounded by the left edge of focal path 611, and thus is projected by planar array of focusing elements 601 at viewing angles within the first range of viewing angles. Similarly, first volume 637a of second icon layer 640 abuts, but does not cross, the left edge of focal path 611. Accordingly, first volume 637a is not projected by planar array of focusing elements at viewing angles within the first range of viewing angles. However, because the locations of second portion 613b and first volume 637a are aligned with the left edge of focal path 611, crossing into and out of the first range of viewing angles results in crisp transitions between synthetic images projected by first icon layer 620 and synthetic images projected by second icon layer 640.

Skilled artisans will appreciate that in certain embodiments according to this disclosure, the relative thicknesses of the focusing elements, icon stack and optical spacer differ from the illustrations of FIGS. 6A-6I, which are drawn to illustrate aspects of the icon structure of micro-optic security devices according to various embodiments of this disclosure.

Figure 7:
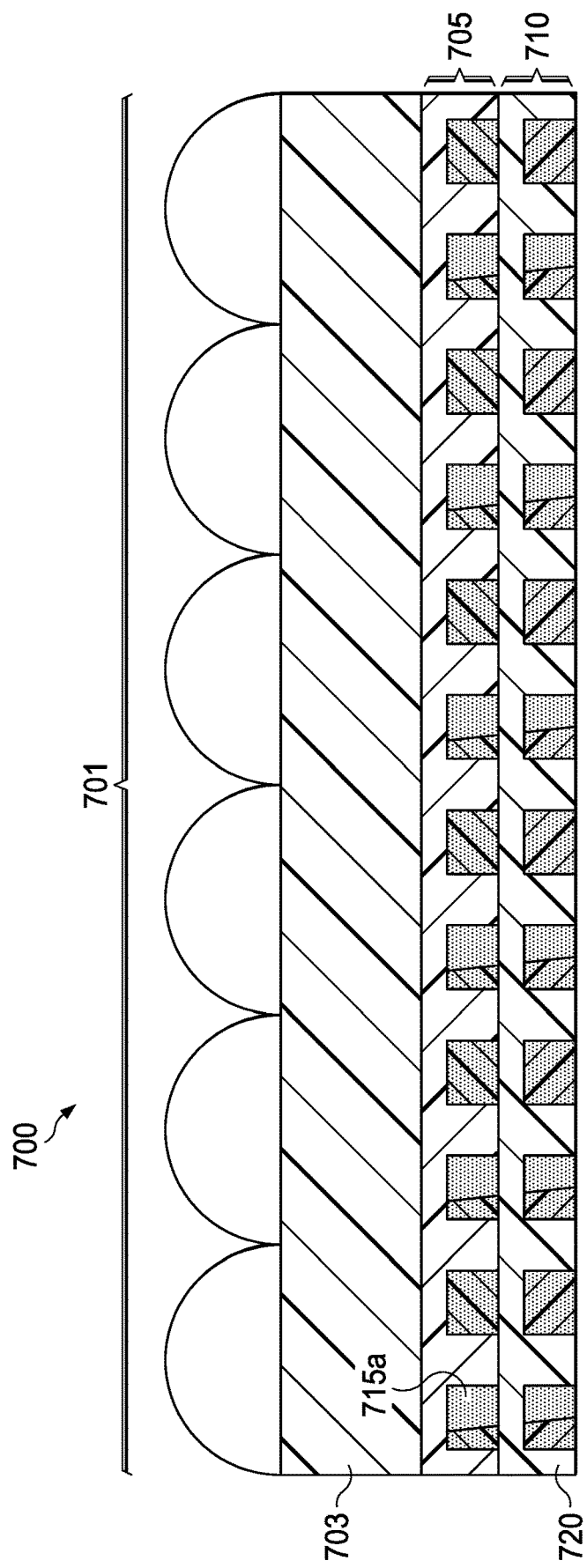
FIG. 7 illustrates constructional aspects of micro-optic security devices according to certain embodiments of this disclosure.

FIG. 7 illustrates constructional aspects of a micro-optic security device according to various embodiments of this disclosure.

Referring to the non-limiting example of FIG. 7, in certain embodiments according to this disclosure, the substantially transparent retaining structures of one image icon layer can be made integral with volumes of substantially transparent material in another layer. In the illustrative example of FIG. 7, a section 700 of a micro-optic security device according to various embodiments of this disclosure is shown in the figure. As shown in the figure, section 700 comprises a planar array of focusing elements 701 (for example, planar array of focusing elements 601 in FIG. 6A), an optical spacer 703 (for example, optical spacer 605 in FIG. 6A), a first icon layer 705 and a second icon layer 710. According to certain embodiments, first icon layer 705 comprises a plurality of retaining structures holding volumes of directionally cured material of a first color (for example, first volume 715a) occupying locations in the retaining structures associated with the focal paths of structured light passing through section 700 from a light source associated with a first viewing angle or range of viewing angles. In some embodiments, to help achieve phase alignment between colored material in first icon layer 705 and second image icon layer, substantially transparent material is used to fill in the regions of the retaining structures of first icon layer 705 which are not filled with directionally cured material of the first color.

As described with reference to the non-limiting examples of FIGS. 6E and 6F of this disclosure, in certain embodiments, regions of colored material are directionally cured, substantially transparent material is applied and cured to fill unfilled areas of the image icon layer, and then retaining structures of the next image icon layer are, in some embodiments, applied in three discrete steps. However, in the illustrative example of FIG. 7, retaining structures of a first icon layer 705 are created (for example, by embossing and curing a substantially transparent light curable polymer), and filled with uncured light curable material of a first color. After excess light curable material of the first color is doctor bladed from the retaining structures, and then directionally cured, to create volumes of cured material of the first color within first icon layer 705. In some embodiments, after uncured material of the first color has been washed off, a layer of uncured substantially transparent light curable material can be applied to fill the unfilled regions of first icon layer 705, embossed to form retaining structures of second icon layer 710, and then cured. According to such embodiments, the substantially transparent retaining structures of second icon layer 710 are integral with portions of first icon layer 705, and form a single "square wave" shaped intermediate layer 720 straddling first icon layer 705 and second icon layer 710. In certain embodiments according to this disclosure, the retaining structures of second icon layer 710 are filled with uncured light-curable material of a second color. After excess light curable material of the second color is removed, (for example, by doctor blading), the light curable material of the second color is directionally cured with patterned light associated with a second range of viewing angles, and uncured. Depending on the specifications for the micro-optic device (for example, where only a two layer icon layer stack is specified), the manufacturing process ends with the washing of uncured material of the second color from second icon layer 710. Alternatively, in some embodiments, a further "square wave" of substantially clear material which is integral with both second icon layer 710, and provides a surface (for example, retaining structures, or a flat surface upon which surface-mounted icons can be formed) for creating a third icon layer (not shown in the figure).

Depending on embodiments, integrating the substantially transparent regions of one image icon layer with the retaining structures of another as a single intermediate layer can advantageously simplify the manufacturing process, and remove some of interface regions between substantially transparent material of first icon layer 705 and substantially transparent retaining structures of second icon layer 710.

Figure 8A:
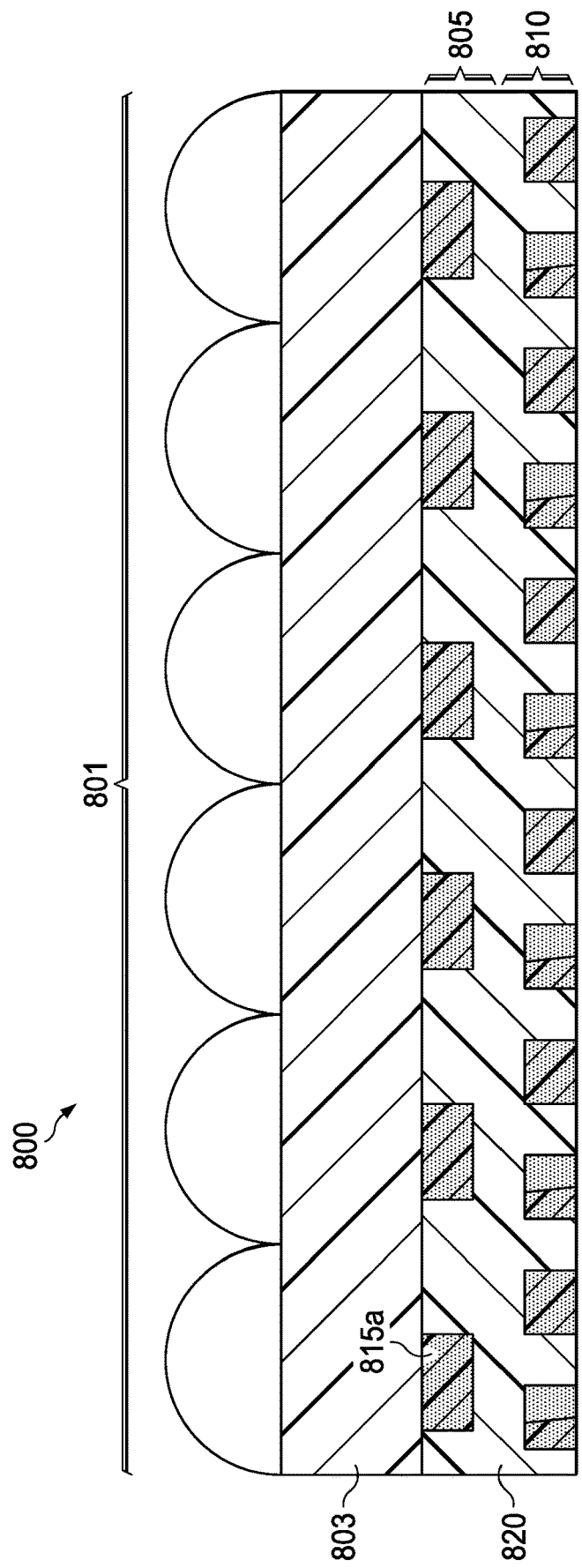
FIGS. 8A and 8B illustrate constructional aspects of micro-optic security devices according to some embodiments of this disclosure.
Figure 8B:
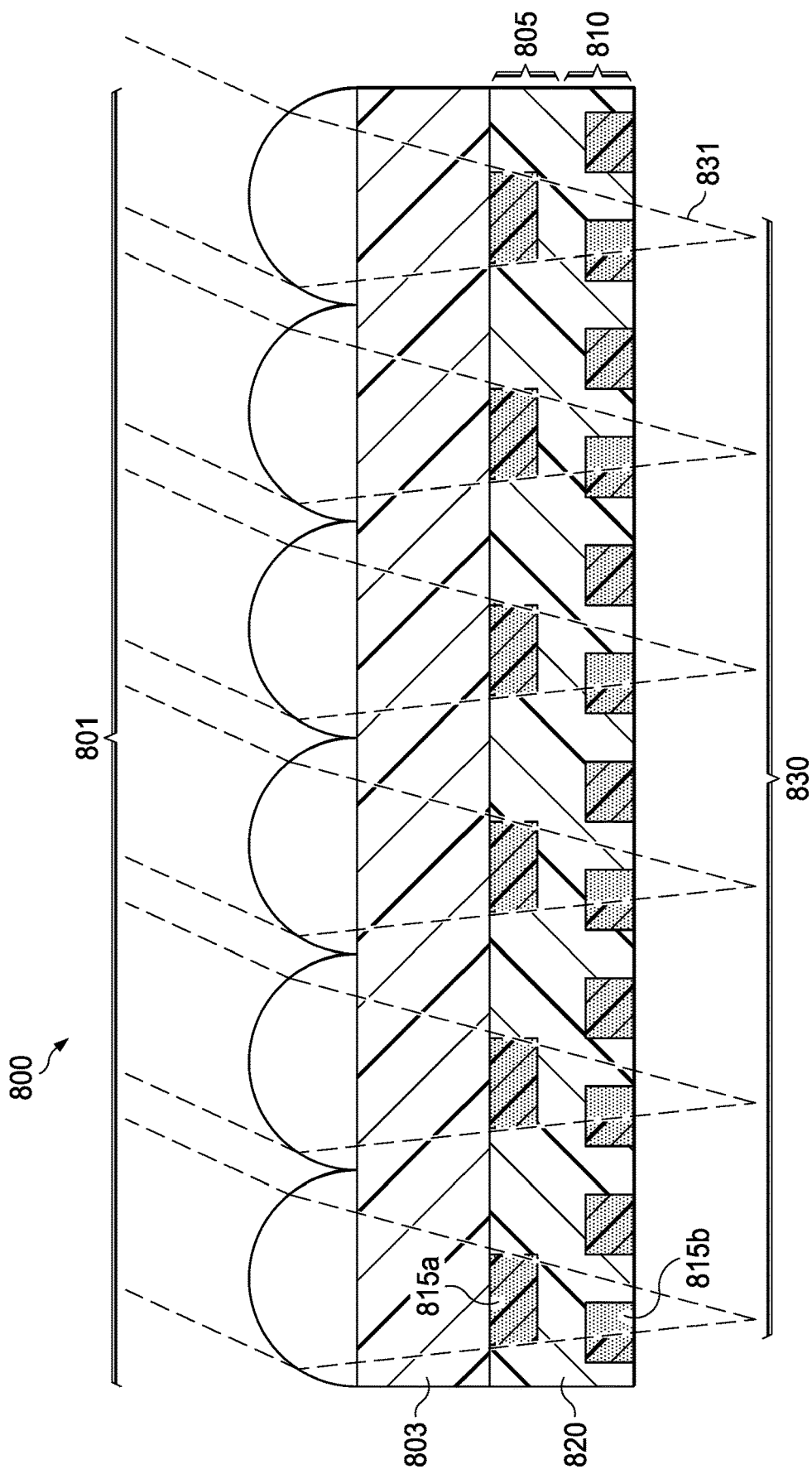

FIGS. 8A and 8B illustrate constructional aspects of micro-optic security devices according to various embodiments of this disclosure. For convenience of cross-reference, structures common to both FIGS. 8A and 8B are numbered the same.

Referring to the non-limiting example of FIG. 8A, a section 800 of a micro-optic security device according to various embodiments of this disclosure is shown in the figure. According to certain embodiments, section 800 comprises a planar array of focusing elements 801 (for example, planar array of focusing elements 307 in FIG. 3A), an optical spacer 803 (for example, optical spacer 703 in FIG. 7), a first icon layer 805, and a second icon layer 810 (for example, second icon layer 710 in FIG. 7). Section 800 of micro-optic security device further comprises an intermediate layer 820 (for example, intermediate layer 720 in FIG. 7) wherein substantially transparent material of the first icon layer 805 is made integral with substantially transparent retaining structures of second icon layer 810.

As shown in the illustrative example of FIG. 8A, first icon layer 805 does not contain retaining structures for positioning volumes of substantially transparent or colored light. Accordingly, the icon structures comprising volumes of light-curable material of a first color (including, for example, first volume 815a) are surface-mounted image icons. According to various embodiments, the icon structures of first icon layer 805 are produced by directionally curing portions of an applied layer of uncured light curable material of the first color (for example, according to the method shown with reference to the example of FIGS. 5A-B of this disclosure).

FIG. 8B illustrates further constructional aspects of section 800 of the micro-optic security device of FIG. 8A by showing plurality of focal paths 830 structured light from one or more sources projecting light upon section 800 at an angle (or range of angles) corresponding to a first range of viewing angles. Referring to the non-limiting example of FIG. 8B, in certain embodiments according to this disclosure, surface-mounted image icons (for example, first volume 815a) can be phase-aligned with icons formed in retaining structures. As shown in this non-limiting example, both the left edge of first volume 815a and the right edge of second volume 815b in second icon layer 810 are bounded by the left edge of focal path 831. Accordingly, at viewing angles within the first range of viewing angles, colored material in second icon layer 810 does not contribute to a synthetic image projected by the micro-optic system. However, because of the phase-alignment between, for example, first volume 815a and second volume 815b, the micro-optic system crisply "switches" from projecting material in first icon layer 805 to projecting material in second icon layer 810 when the viewing angle exits the first range of viewing angles associated with plurality of focal paths 830.

Referring to the illustrative example of FIG. 8B, certain embodiments according to this disclosure afford flexibility in the design of micro-optic security systems. As noted previously in this disclosure, the use of retaining structures as part of forming icon layers, in many ways, a mature technology, which has been refined and made suitable for large scale production of micro-optic security devices. At the same time, digital tooling, and the creation of icon structures without having to make molds for retaining structures offers new possibilities, including, without limitation, the ability to change the icon structure of the end product without the retooling costs associated with making new molds for retaining structures, and "freeing up" areas of the icon layer for additional colored icon structures. As shown in the non-limiting example of FIG. 8B, first volume 815a occupies the full width of focal path, 831. By contrast, colored icons of similar width cannot be formed in second icon layer 810, given the spacing of the retaining structures in this example. According to certain embodiments, micro-optic systems according to the present disclosure allow designers and manufacturers of micro-optic security devices to mix physical tooling (i.e., using cast retaining structures) and digital tooling (i.e., making surface-mounted icons) in the layers of an image icon stack, thereby enjoying both the flexibility of digital tooling, and the convenience and accrued expertise of working with physical tooling.

As with FIGS. 6A-6I and FIG. 7 of this disclosure, skilled artisans will appreciate that, in the explanatory examples of FIGS. 8A and 8B, the figures have been drawn to emphasize the icon structure, and that the thickness of the icon layer stack relative to the rest of the micro-optic device in these figures may differ from those of certain real-world devices.

Figure 9:
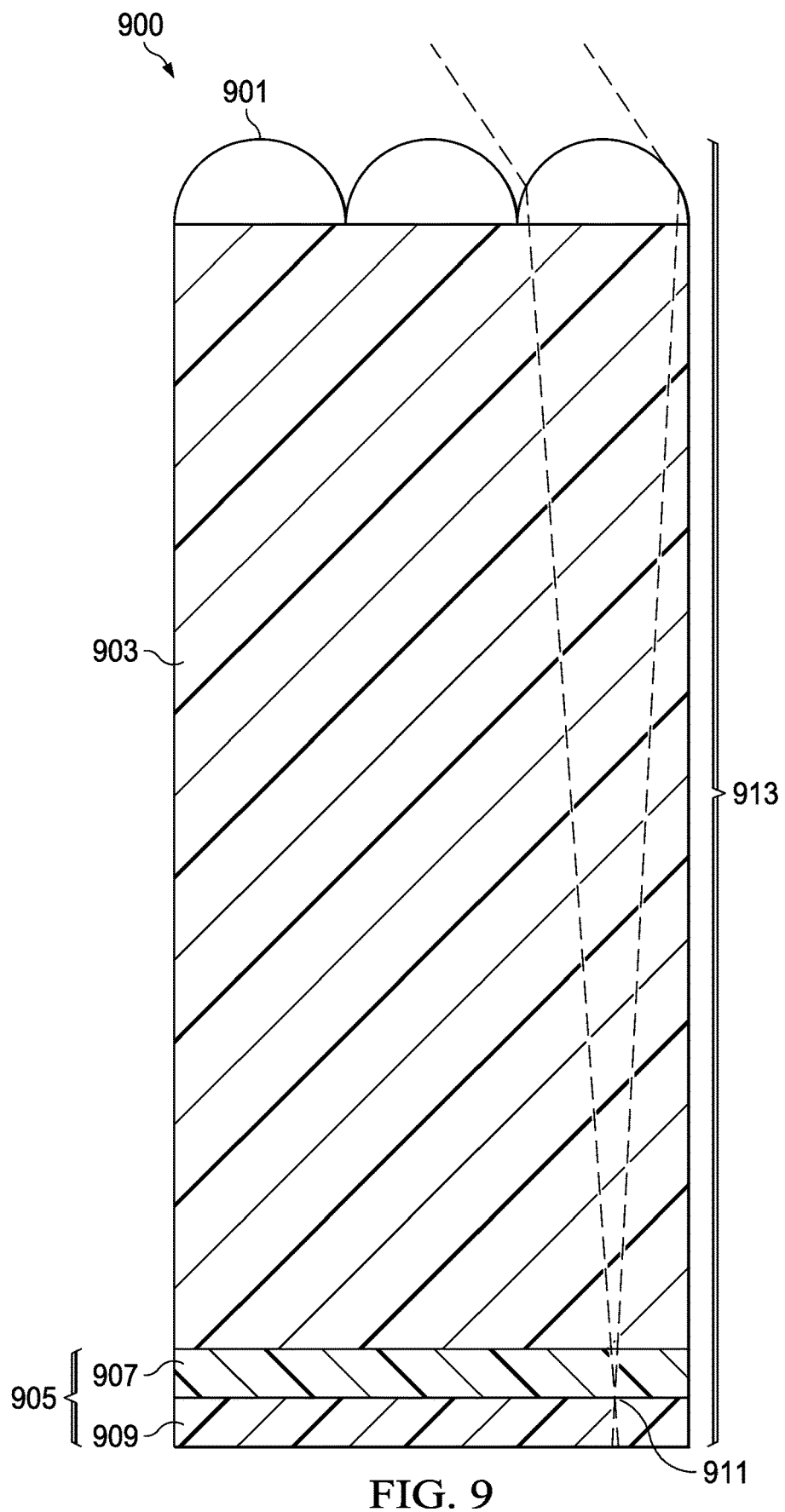
FIG. 9 illustrates constructional aspects of micro-optic security devices according to various embodiments of this disclosure.

FIG. 9 illustrates constructional aspects of micro-optic security devices according to various embodiments of this disclosure.

Referring to the illustrative example of FIG. 9, an example of 900 of a micro-optic security device 900 is provided to illustrate the proportions of a two layer icon layer stack relative to the rest of micro-optic security device 900, according to certain embodiments of this disclosure.

According to certain embodiments, micro-optic security device 900 comprises a planar array of focusing elements 901 (for example, planar array of focusing elements 603 in FIG. 6A), an optical spacer 903 (for example, optical spacer 310 in FIG. 3A), and an icon layer stack 905 comprising a first icon layer 907 and a second icon layer 909. In various embodiments, micro-optic security device 900 is constructed such that the focusing elements of planar array of focusing elements 901 focus light upon points in a plane 911 along the boundary between first icon layer 907 and second icon layer 909. In this way, the components of each layer of icon layer stack 905 appear equally "in focus" in synthetic images projected by micro-optic security device 900.

In various embodiments according to this disclosure, micro-optic security device 900 has an overall thickness 913, as measured from the exterior of second icon layer 909 to the exterior of planar array of focusing elements 901 of 5 to 500 microns. In some embodiments, micro-optic security device 900 has an overall thickness ranging from 10 to 200 microns. In some embodiments, micro-optic security device 900 has a thickness of 20 to 60 microns. Skilled artisans will appreciate that, in many embodiments, the overall thickness of the device reflects a tradeoff between various performance parameters of interest, including the maximum permissible thickness of micro-optic security device 900, manufacturing concerns (for example, the number of steps in the manufacturing process), and the optical performance requirements of the end user (for example, how detailed and dynamic a visual effect to be provided by micro-optic security device 900 is required). Skilled artisans will further appreciate that, the overall thickness of micro-optic security device 900 depends on a variety of factors, including without limitation, the number of layers in icon layer stack 905, the pitch of focusing elements used to construct planar array of focusing elements 901, and the index of refraction of the material used to construct planar array of focusing elements 901, and that embodiments which are thicker or thinner than 5 to 500 microns are possible, and within the contemplated scope of this disclosure. According to certain embodiments in which the overall thickness of micro-optic security device 900 is on the order of 40 microns, a two layer image icon stack 905 has a thickness on the order of 3 microns.

Examples of micro-optic security devices according to certain embodiments of this disclosure include security devices comprising a planar array of microlenses, configured to focus light along a plurality of focal paths, the plurality of focal paths associated with a viewing angle of the micro-optic security device and an icon layer stack disposed along the plurality of focal paths. According to various embodiments, the icon layer stack comprises a first icon layer comprising volumes of cured material of a first color at locations along focal paths of a first range of viewing angles and volumes of substantially transparent material at locations outside of focal paths of the first range of viewing angles. The icon layer stack further comprises a second icon layer disposed below the first icon layer relative to the planar array of microlenses. The second icon layer comprises volumes of substantially transparent cured material at locations along focal paths of the first range of viewing angles and volumes of cured material of a second color at locations along focal paths of a second range of viewing angles. At least one of the first icon layer or the second icon layer comprises a plurality of substantially transparent retaining structures.

Examples of micro-optic security devices according to certain embodiments of this disclosure include security devices wherein the first icon layer comprises the plurality of substantially transparent retaining structures, and wherein the second icon layer comprises a second plurality of substantially transparent retaining structures.

Examples of micro-optic security devices according to certain embodiments of this disclosure include security devices wherein the first icon layer comprises the plurality of substantially transparent retaining structures, and wherein the volumes of cured material of the second color comprise surface-mounted icons.

Examples of micro-optic security devices according to certain embodiments of this disclosure include security devices wherein the second icon layer comprises the plurality of substantially transparent retaining structures, and wherein the volumes of cured material of the first color comprise surface mounted icons.

Examples of micro-optic security devices according to certain embodiments of this disclosure include security devices wherein the second color contrasts with the first color.

Examples of micro-optic security devices according to certain embodiments of this disclosure include security devices wherein the second color does not contrast with the first color.

Examples of micro-optic security devices according to certain embodiments of this disclosure include security devices further comprising an optical spacer disposed between the planar array of microlenses and the first icon layer.

Examples of micro-optic security devices according to certain embodiments of this disclosure include security devices wherein the first icon layer comprises the plurality of substantially transparent retaining structures, and wherein the substantially transparent cured material at locations outside of focal paths of the first range of viewing angles is integral with the second icon layer.

Examples of micro-optic security devices according to certain embodiments of this disclosure include security devices wherein the planar array of microlenses comprises a region in which microlenses of the planar array of microlenses are disposed at a first local repeat period, wherein the first icon layer comprises a second region in which volumes of cured material of the first color are disposed at a second local repeat period, and wherein a ratio of the first local repeat period to the second local repeat period is such that the microlenses project a synthetic image of portions of the volumes of cured material of the first color at the first range of viewing angles.

Examples of micro-optic security devices according to certain embodiments of this disclosure include security devices wherein the second icon layer comprises a third region in which volumes of cured material of the second color are disposed at a third local repeat period, and wherein a ratio of the first local repeat period to the third local repeat period is such that the microlenses project a synthetic image of portions of the volumes of cured material of the second color at the second range of viewing angles.

Examples of micro-optic security devices according to certain embodiments of this disclosure include security devices wherein the first range of viewing angles comprises an angle corresponding to a vector normal to the plane of the micro-optic security device (e.g., top dead center).

Examples of micro-optic security devices according to certain embodiments of this disclosure include security devices comprising one or more interface regions disposed between the substantially transparent retaining structures and one or more the volumes of substantially transparent material at locations outside of focal paths of the first range of viewing angles.

Examples of micro-optic security devices according to certain embodiments of this disclosure include security devices wherein the first range of viewing angles is consecutive to the second range of viewing angles, and wherein the micro-optic security device projects a synthetic image of portions of volumes of cured material of the first color at locations along focal paths of a first range of viewing angles which disappears as a viewing angle transitions from the first range of viewing angles to the second range of viewing angles.

Examples of micro-optic security devices according to certain embodiments of this disclosure include security devices comprising a planar array of focusing elements, configured to focus light along a plurality of focal paths, the plurality of focal paths associated with a viewing angle of the micro-optic security device; and an icon layer stack disposed along the plurality of focal paths, the icon layer stack comprising: a first icon layer comprising volumes of directionally cured material of a first color, wherein the volumes of directionally cured material of the first color are associated with a first range of viewing angles of the micro-optic security device; a second icon layer comprising volumes of cured material of a second color, at locations along focal paths of a second range of viewing angles, wherein at least one of the first icon layer of the second icon layer comprises a plurality of substantially transparent retaining structures, and wherein the second range of viewing angles is not coextensive with the first range of viewing angles.

Examples of micro-optic security devices according to certain embodiments of this disclosure include micro-optic security devices wherein the second icon layer further comprises volumes of directionally cured substantially transparent material, and wherein the volumes of directionally cured substantially transparent material are associated with the first range of viewing angles of the micro-optic security device.

Examples of micro-optic security devices according to certain embodiments of this disclosure include micro-optic security devices wherein the second range of viewing angles is complementary to the first range of viewing angles.

Examples of micro-optic security devices according to certain embodiments of this disclosure include micro-optic security devices wherein the second range of viewing angles is adjacent to the first range of viewing angles.

Examples of micro-optic security devices according to certain embodiments of this disclosure include micro-optic security devices wherein the second range of viewing angles overlaps the first range of viewing angles.

Examples of micro-optic security devices according to certain embodiments of this disclosure include security devices further comprising an optical spacer contacting at least one of the planar array of focusing elements or the icon layer stack.

Examples of micro-optic security devices according to certain embodiments of this disclosure include security devices wherein focusing elements of the planar array of focusing elements are reflective focusing elements.

Examples of micro-optic security devices according to certain embodiments of this disclosure include security devices wherein focusing elements of the planar array of focusing elements are refractive focusing elements.

Examples of micro-optic security devices according to certain embodiments of this disclosure include security devices wherein the second color contrasts with the first color.

Examples of micro-optic security devices according to certain embodiments of this disclosure include security devices wherein the second color does not contrast with the first color.

Examples of micro-optic security devices according to certain embodiments of this disclosure include security devices wherein the planar array of focusing elements comprises a region in which focusing elements of the planar array of focusing elements are disposed at a first local repeat period, wherein the first icon layer comprises a second region in which volumes of cured material of the first color are disposed at a second local repeat period, and wherein a ratio of the first local repeat period to the second local repeat period is such that the focusing elements project a synthetic image of portions of the volumes of directionally cured material of the first color at the first range of viewing angles.

Examples of micro-optic security devices according to certain embodiments of this disclosure include security devices wherein the second icon layer comprises a third region in which volumes of cured material of the second color are disposed at a third local repeat period, and wherein a ratio of the first local repeat period to the third local repeat period is such that the focusing elements project a synthetic image of portions of the volumes of cured material of the second color at a second range of viewing angles.

Examples of micro-optic security devices according to certain embodiments of this disclosure include security devices wherein the first range of viewing angles comprises top dead center.

Examples of micro-optic security devices according to certain embodiments of this disclosure include security devices comprising one or more interface regions disposed between the substantially transparent retaining structures and one or more of the volumes of substantially transparent material at locations outside of focal paths of the first range of viewing angles.

Examples of micro-optic security devices according to certain embodiments of this disclosure include security devices wherein the first range of viewing angles is consecutive to a second range of viewing angles, and the micro-optic security device projects a synthetic image of portions of the volumes of directionally cured material of the first color which disappears as a viewing angle transitions from the first range of viewing angles to the second range of viewing angles.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

What is claimed is:

1. A micro-optic security device, comprising:
    a first icon layer including:
       volumes of cured material of a first color at locations along focal paths of a first range of viewing angles; and
       volumes of substantially transparent material at locations outside of focal paths of the first range of viewing angles; and
    a second icon layer disposed below the first icon layer, the second icon layer further comprising:
       volumes of substantially transparent cured material at locations along focal paths of the first range of viewing angles; and
       volumes of cured material of a second color at locations along focal paths of a second range of viewing angles,
    wherein the volumes of cured material of the first color and the volumes of cured material of the second color are phase-aligned.

2. The micro-optic security device of claim 1, wherein at least one of the first icon layer or the second icon layer comprises a plurality of substantially transparent retaining structures.

3. The micro-optic security device of claim 2,
    wherein the first icon layer comprises the plurality of substantially transparent retaining structures, and
    wherein the second icon layer comprises a second plurality of substantially transparent retaining structures.

4. The micro-optic security device of claim 2,
    wherein the first icon layer comprises the plurality of substantially transparent retaining structures, and
    wherein the volumes of cured material of the second color comprise surface-mounted icons.

5. The micro-optic security device of claim 2,
    wherein the second icon layer comprises the plurality of substantially transparent retaining structures, and
    wherein the volumes of cured material of the first color comprise surface mounted icons.

6. The micro-optic security device of claim 2,
    wherein the first icon layer comprises the plurality of substantially transparent retaining structures, and
    wherein the substantially transparent cured material at locations outside of focal paths of the first range of viewing angles is integral with the second icon layer.

7. The micro-optic security device of claim 2, further comprising:
    one or more interface regions disposed between the substantially transparent retaining structures and one or more of the volumes of substantially transparent material at locations outside of focal paths of the first range of viewing angles.

8. The micro-optic security device of claim 1,
    wherein the first range of viewing angles is consecutive to the second range of viewing angles, and
    wherein the micro-optic security device projects a synthetic image of portions of volumes of cured material of the first color at locations along focal paths of the first range of viewing angles which disappears as a viewing angle transitions from the first range of viewing angles to the second range of viewing angles.

9. The micro-optic security device of claim 1, wherein the second color contrasts with the first color.

10. The micro-optic security device of claim 1, wherein the second color does not contrast with the first color.

11. The micro-optic security device of claim 1, further comprising:
a planar array of microlenses, configured to focus light along a plurality of focal paths, the plurality of focal paths associated with a viewing angle of the micro-optic security device.

12. The micro-optic security device of claim 11, wherein the first icon layer and the second icon layer are disposed in an icon layer stack disposed along the plurality of focal paths.

13. The micro-optic security device of claim 12, further comprising an optical spacer disposed between the planar array of microlenses and the first icon layer.

14. The micro-optic security device of claim 13, wherein the optical spacer contacts at least one of the planar array of focusing elements or the icon layer stack.

15. The micro-optic security device of claim 11,
wherein the planar array of microlenses comprises a region in which microlenses of the planar array of microlenses are disposed at a first local repeat period,
wherein the first icon layer comprises a second region in which volumes of cured material of the first color are disposed at a second local repeat period, and
wherein a ratio of the first local repeat period to the second local repeat period is such that the microlenses project a synthetic image of portions of the volumes of cured material of the first color at the first range of viewing angles.

16. The micro-optic security device of claim 15,
wherein the second icon layer comprises a third region in which volumes of cured material of the second color are disposed at a third local repeat period, and
wherein a ratio of the first local repeat period to the third local repeat period is such that the microlenses project a synthetic image of portions of the volumes of cured material of the second color at the second range of viewing angles.

17. The micro-optic security device of claim 11, wherein focusing elements of the planar array of focusing elements are reflective focusing elements or refractive focusing elements.

18. The micro-optic security device of claim 1, wherein the first range of viewing angles comprises top dead center.

19. The micro-optic security device of claim 1, wherein the second range of viewing angles is adjacent to the first range of viewing angles.

20. The micro-optic security device of claim 1, wherein the second range of viewing angles overlaps the first range of viewing angles.

* * * * *